US009141122B2

(12) United States Patent  (10) Patent No.: US 9,141,122 B2
Ikawa et al.  (45) Date of Patent: Sep. 22, 2015

(54) PHOTOVOLTAIC POWER GENERATION SYSTEM

(75) Inventors: Eiichi Ikawa, Tokyo (JP); Naoki Fujiwara, Tokyo (JP); Takashi Oozeki, Tsukuba (JP); Kyungsoo Lee, Hwaseong-si (KR)

(73) Assignee: Toshiba Mitsubishi-Electric Industrial Systems Corporation, Tokyo (JP)

( * ) Notice: Subject to any disclaimer, the term of this patent is extended or adjusted under 35 U.S.C. 154(b) by 596 days.

(21) Appl. No.: 13/594,020

(22) Filed: Aug. 24, 2012

(65) Prior Publication Data

US 2013/0054037 A1  Feb. 28, 2013

Related U.S. Application Data

(63) Continuation of application No. PCT/JP2010/053164, filed on Feb. 26, 2010.

(51) Int. Cl.
*G06F 1/26* (2006.01)
*G05F 1/67* (2006.01)

(52) U.S. Cl.
CPC .. *G05F 1/67* (2013.01); *Y02E 10/58* (2013.01)

(58) Field of Classification Search
CPC ........... G05F 1/67; Y02E 10/58; Y02E 10/47; Y02E 10/50; F24J 2/38; F24J 2/542; G01S 3/7861; H02S 20/00; H01L 31/0522; H01L 31/054; G05D 3/105; H02J 1/14; H02J 7/35
See application file for complete search history.

(56) References Cited

U.S. PATENT DOCUMENTS

| | | | | |
|---|---|---|---|---|
| 4,924,175 A * | 5/1990 | Clinton | | 324/73.1 |
| 6,111,767 A * | 8/2000 | Handleman | | 363/95 |
| 6,239,997 B1 * | 5/2001 | Deng | | 363/95 |
| 7,193,872 B2 * | 3/2007 | Siri | | 363/95 |
| 7,538,451 B2 * | 5/2009 | Nomoto | | 307/66 |
| 7,986,539 B2 * | 7/2011 | Fornage | | 363/74 |
| 2005/0017697 A1 * | 1/2005 | Capel | | 323/266 |
| 2005/0172995 A1 * | 8/2005 | Rohrig et al. | | 136/243 |
| 2008/0238195 A1 * | 10/2008 | Shaver et al. | | 307/18 |
| 2008/0290252 A1 * | 11/2008 | Leonhardt et al. | | 250/203.4 |

(Continued)

FOREIGN PATENT DOCUMENTS

CN 1808164 7/2006
EP 1691246 A2 * 8/2006

(Continued)

OTHER PUBLICATIONS

Notification of the First Office Action from the State Intellectual Property Office of the People's Republic of China mailed Nov. 18, 2013, for counterpart Chinese Patent Application No. 201080064675.2, and English translation thereof (18 pages total).

(Continued)

*Primary Examiner* — Robert Fennema
*Assistant Examiner* — Yagnesh J Trivedi
(74) *Attorney, Agent, or Firm* — Finnegan, Henderson, Farabow, Garrett & Dunner, LLP

(57) ABSTRACT

A photovoltaic power generation system includes a photovoltaic array including photovoltaic modules, the photovoltaic power generation system further includes a control apparatus configured to display output characteristics of the photovoltaic array and power generating conditions of the photovoltaic array in synchronization.

22 Claims, 22 Drawing Sheets

(56) References Cited

U.S. PATENT DOCUMENTS

| | | | |
|---|---|---|---|
| 2009/0145480 A1* | 6/2009 | Adest et al. | 136/259 |
| 2010/0001587 A1* | 1/2010 | Casey et al. | 307/80 |
| 2010/0138063 A1* | 6/2010 | Cardinal et al. | 700/291 |
| 2011/0210611 A1* | 9/2011 | Ledenev et al. | 307/71 |

FOREIGN PATENT DOCUMENTS

| | | |
|---|---|---|
| JP | 10-63358 | 3/1998 |
| JP | 10-326902 | 12/1998 |
| JP | 2000-232736 | 8/2000 |
| JP | 2002-340628 | 11/2002 |
| JP | 2003-133569 | 5/2003 |
| JP | 2004-077309 | 3/2004 |
| JP | 2005-528071 | 9/2005 |
| JP | 2005-340464 | 12/2005 |
| JP | 2006-201827 | 8/2006 |
| JP | 2009-148014 | 7/2009 |

OTHER PUBLICATIONS

English-language translation of International Preliminary Report on Patentability from the Japanese Patent Office For International Application No. PCT/JP2010/053164, mailing date Sep. 27, 2012.

English-language translation of International Search Report from the Japanese Patent Office for International Application No. PCT/JP2010/053164, mailing date May 18, 2010.

First Office Action from the Japan Patent Office, dated Oct. 14, 2014, for counterpart Japanese Patent Application No. 2014-004214, and English translation thereof (7 pages total).

* cited by examiner

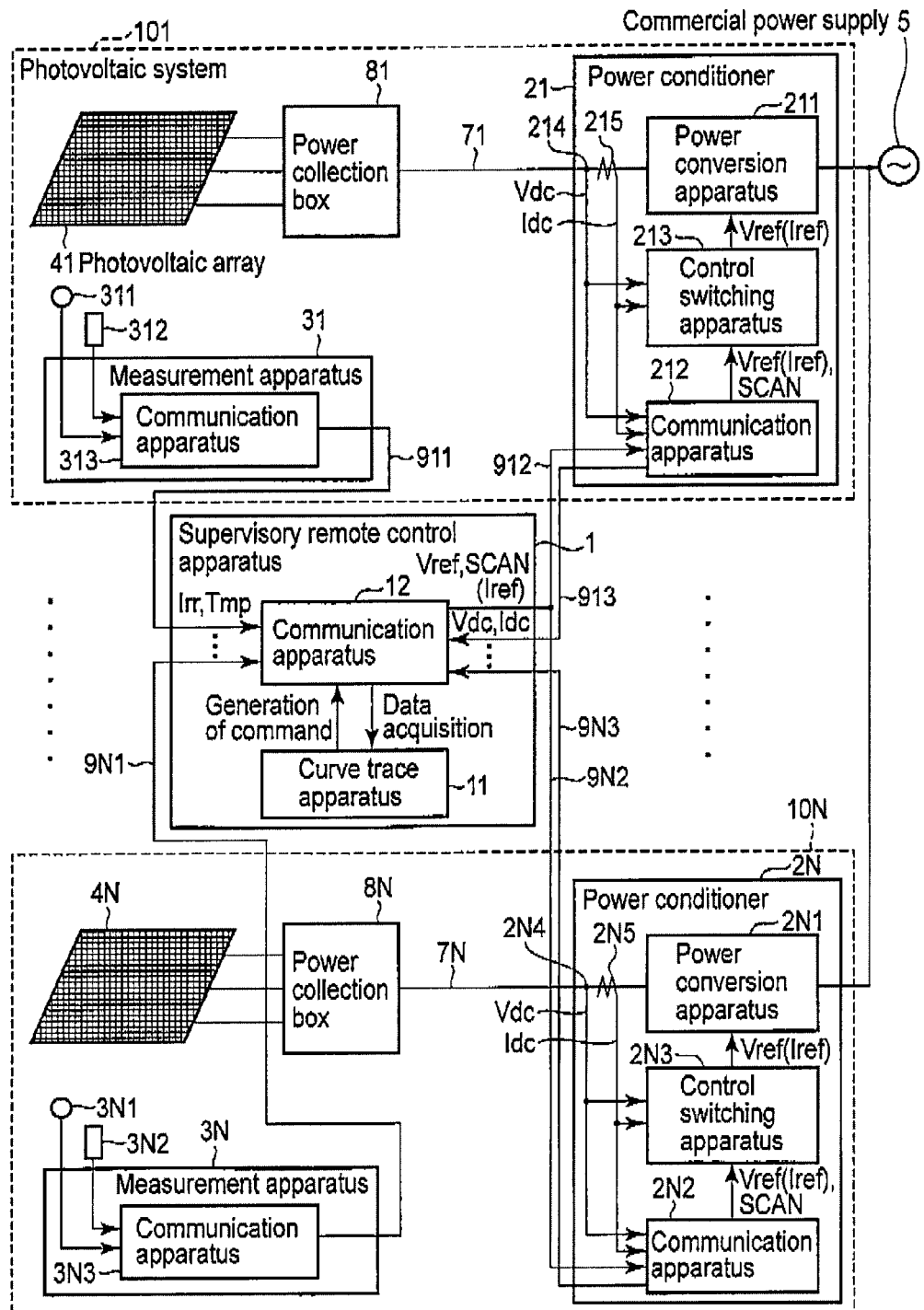
F I G. 1

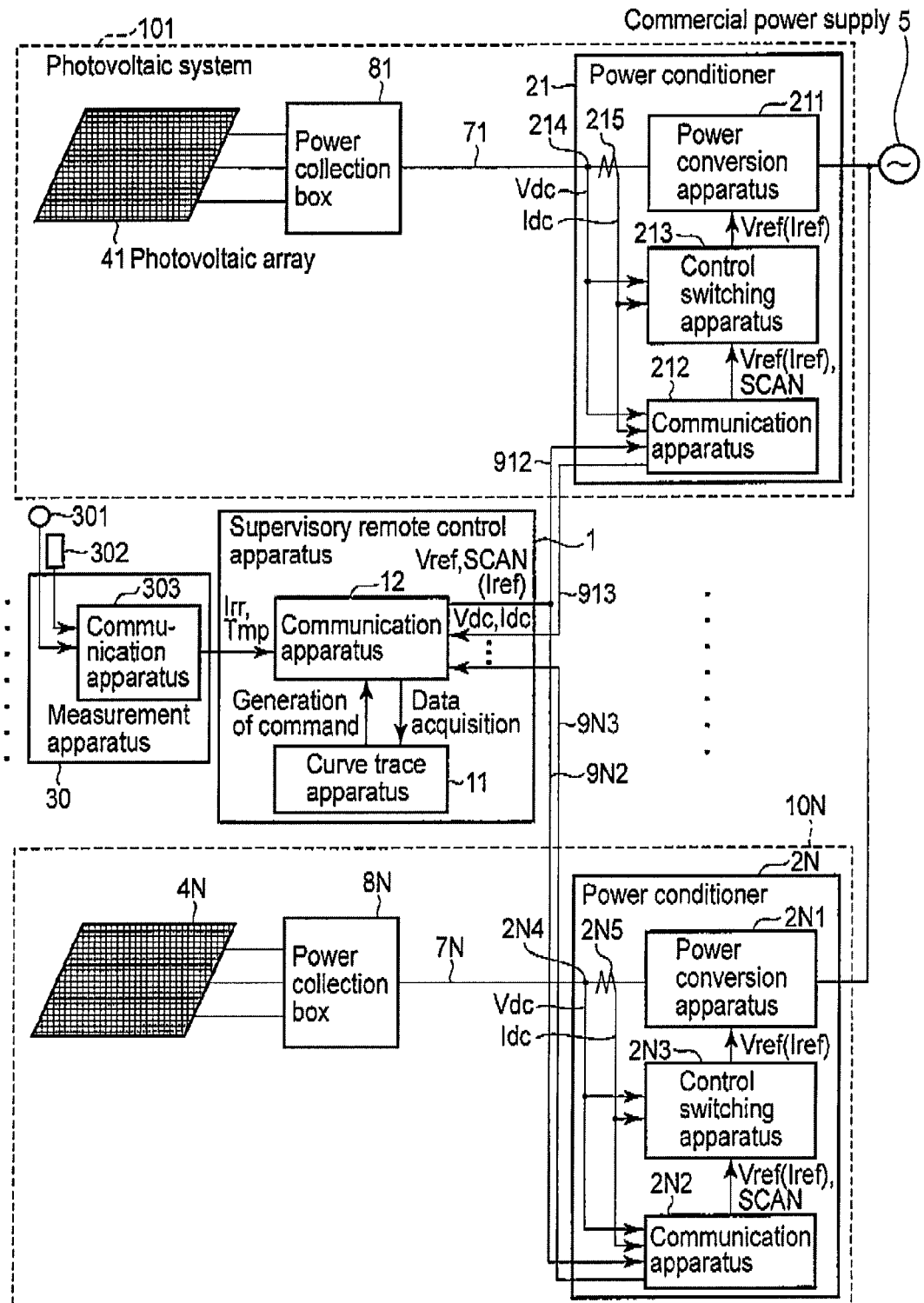
F I G. 2

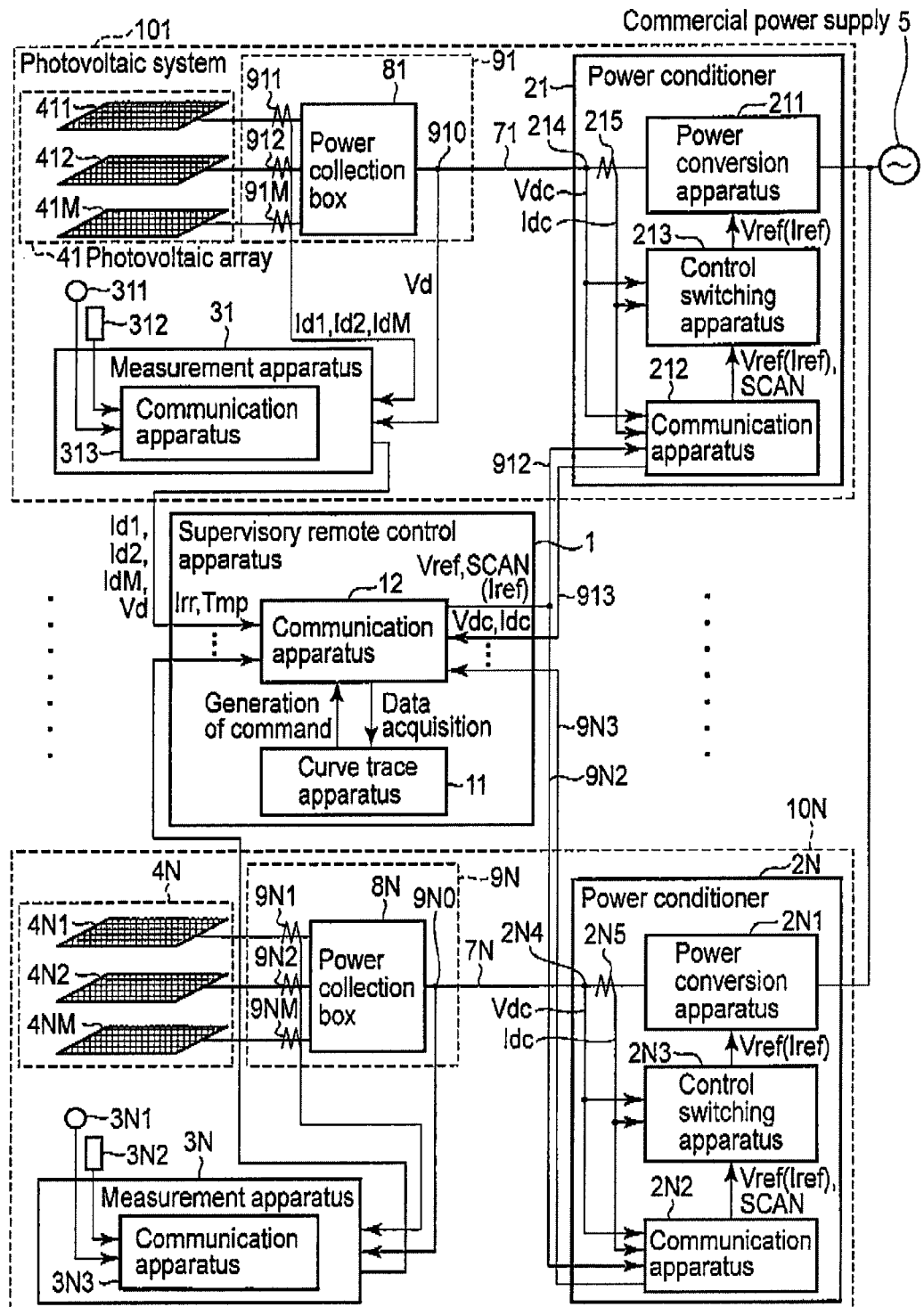
F I G. 3

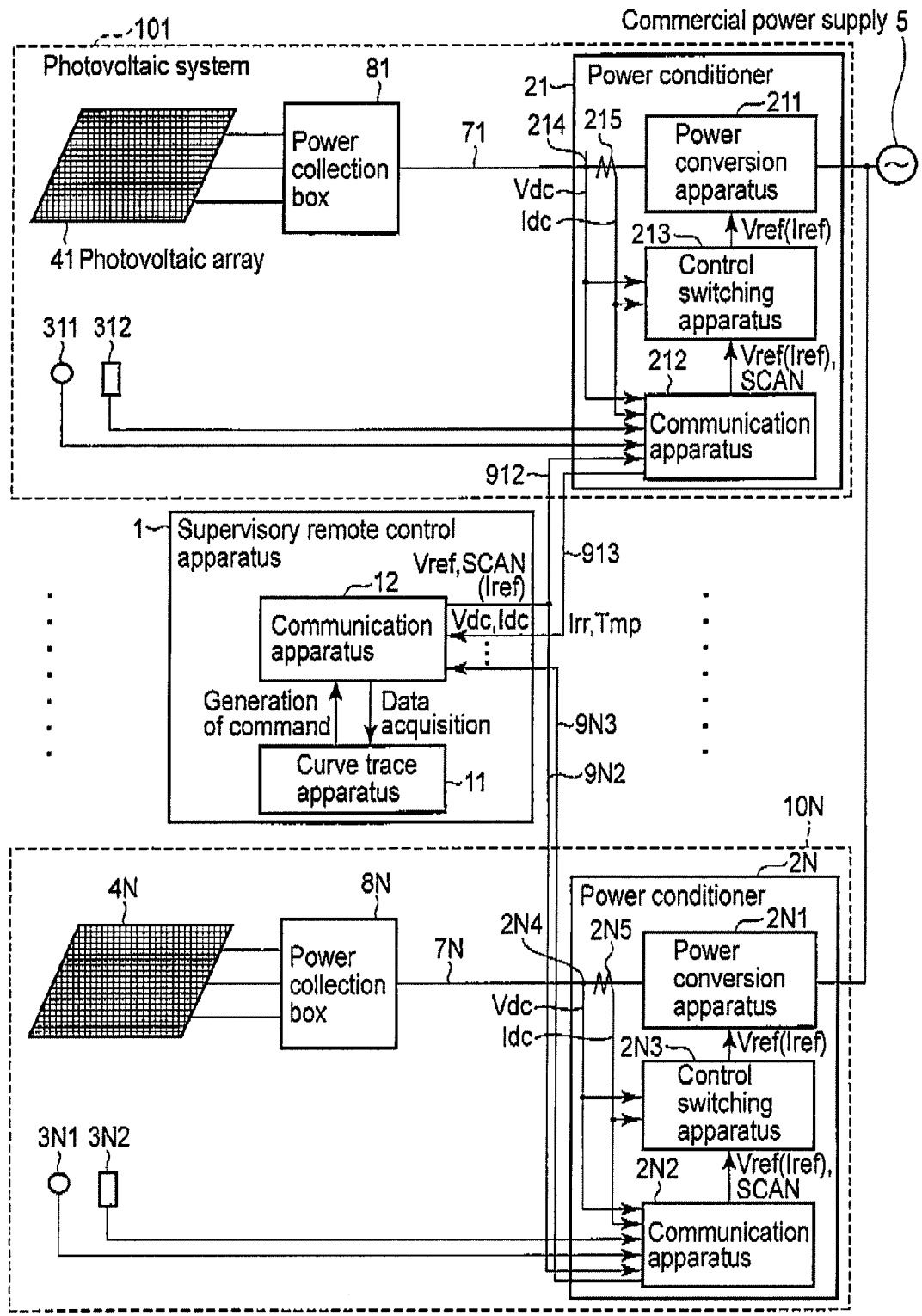
F I G. 4

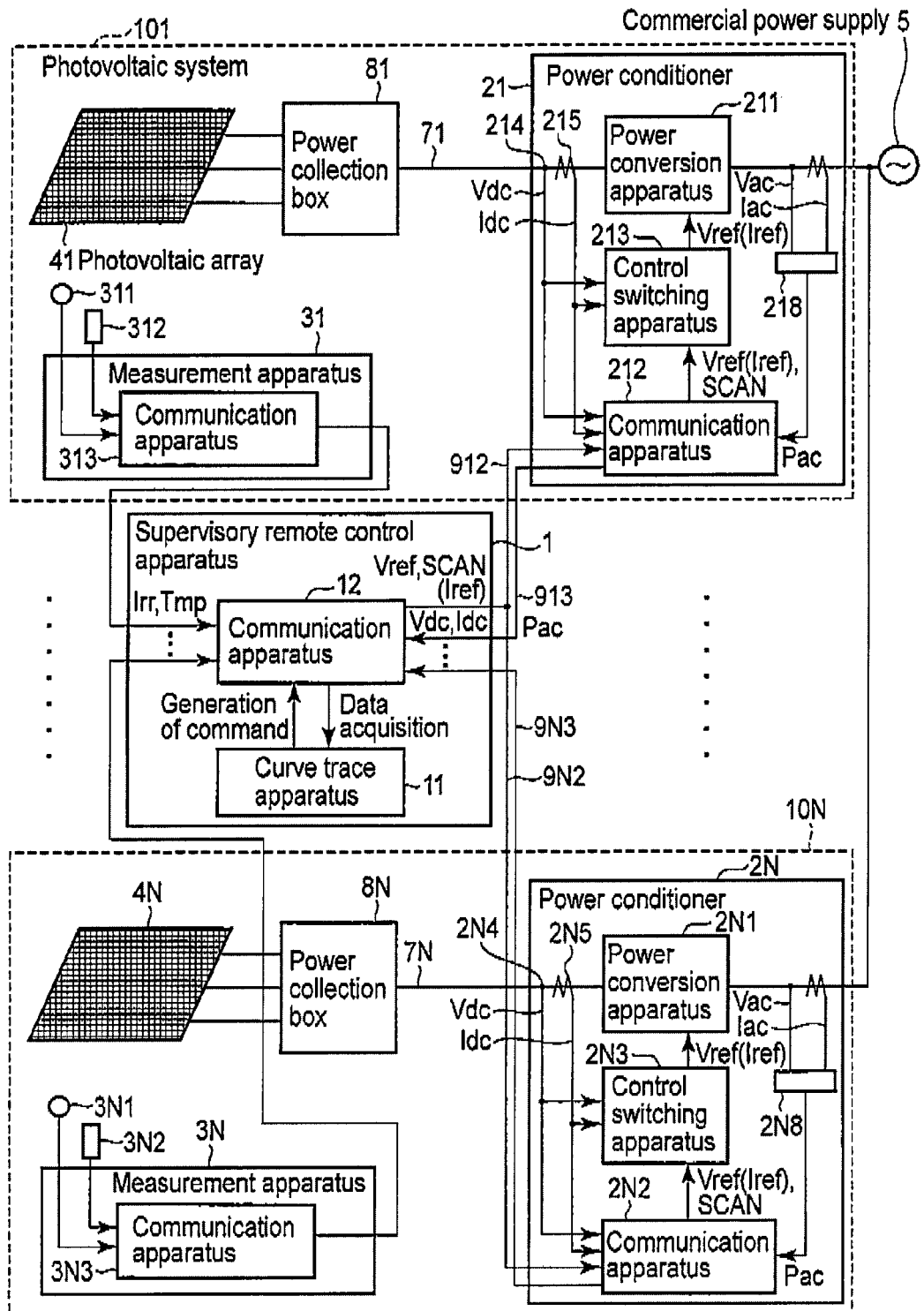
F I G. 6

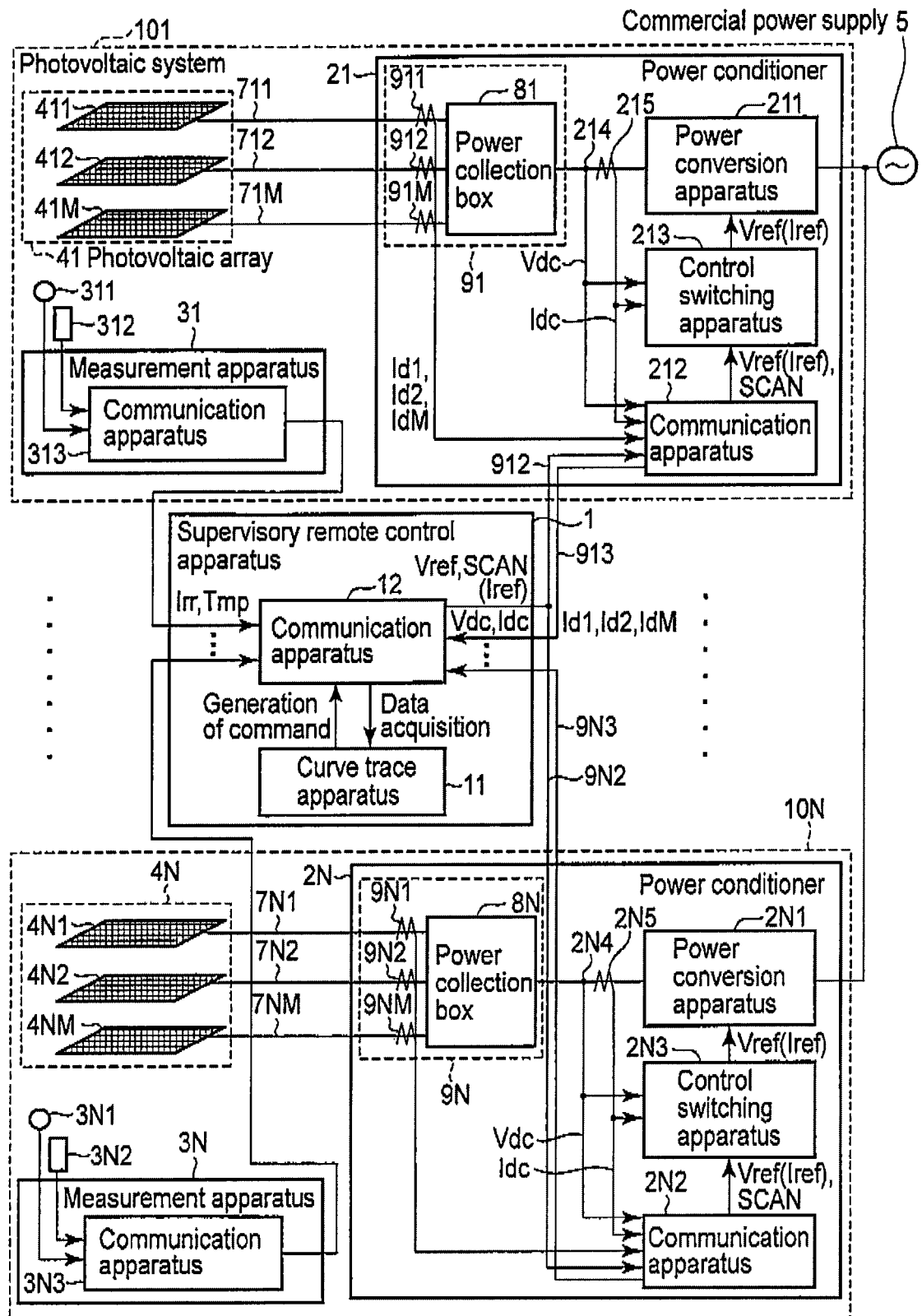
F I G. 7

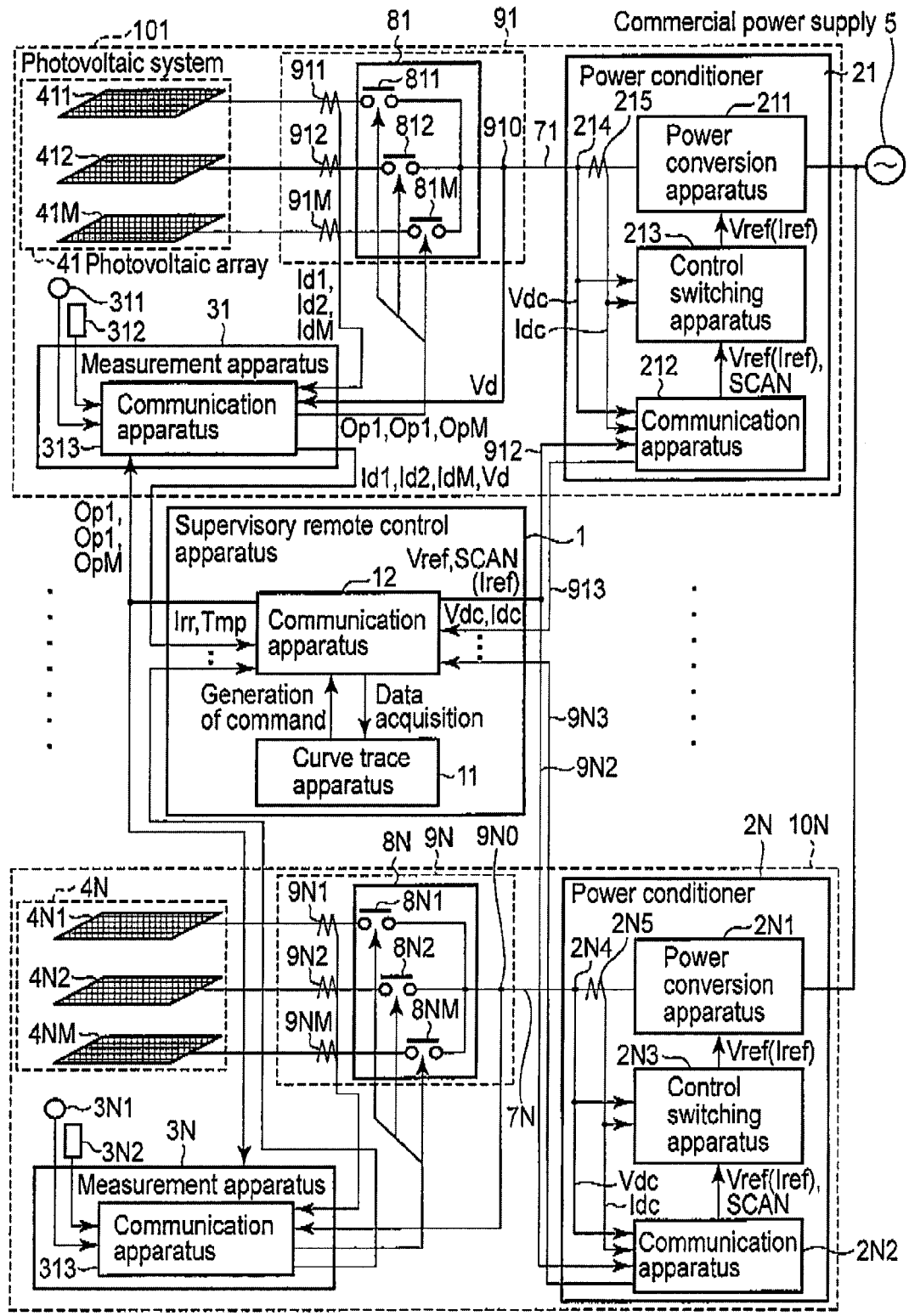
F I G. 8

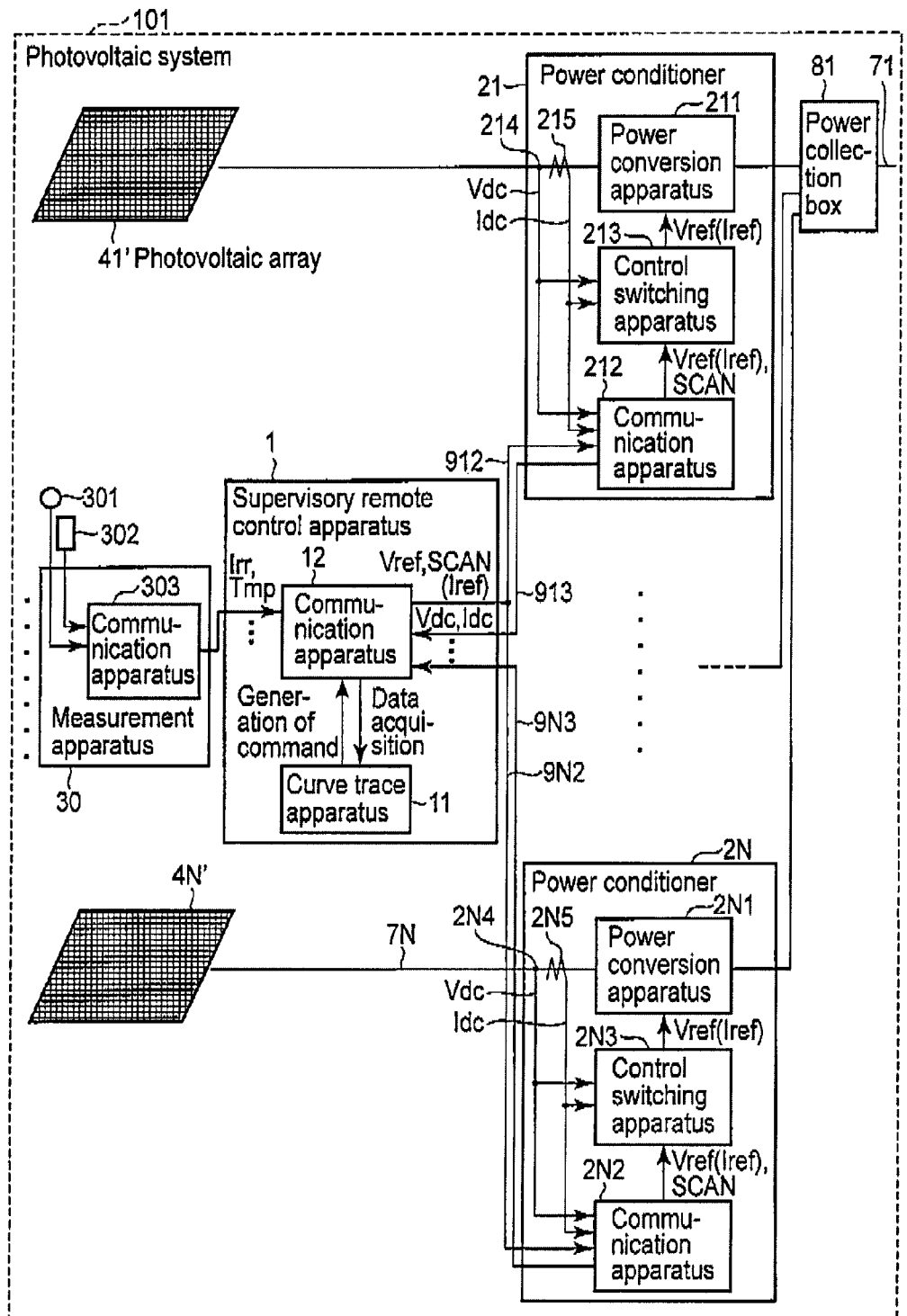
F I G. 10

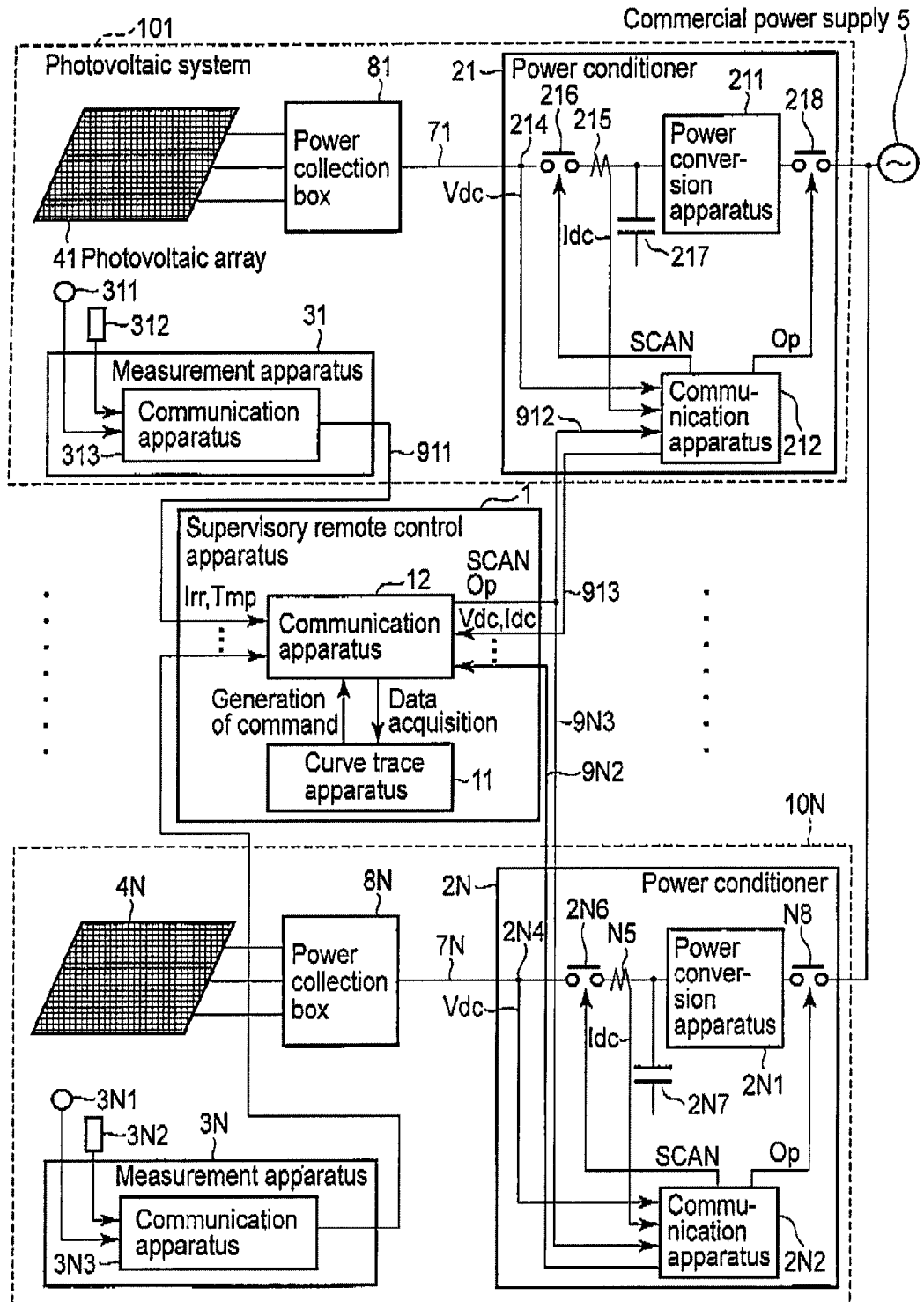
F I G. 11

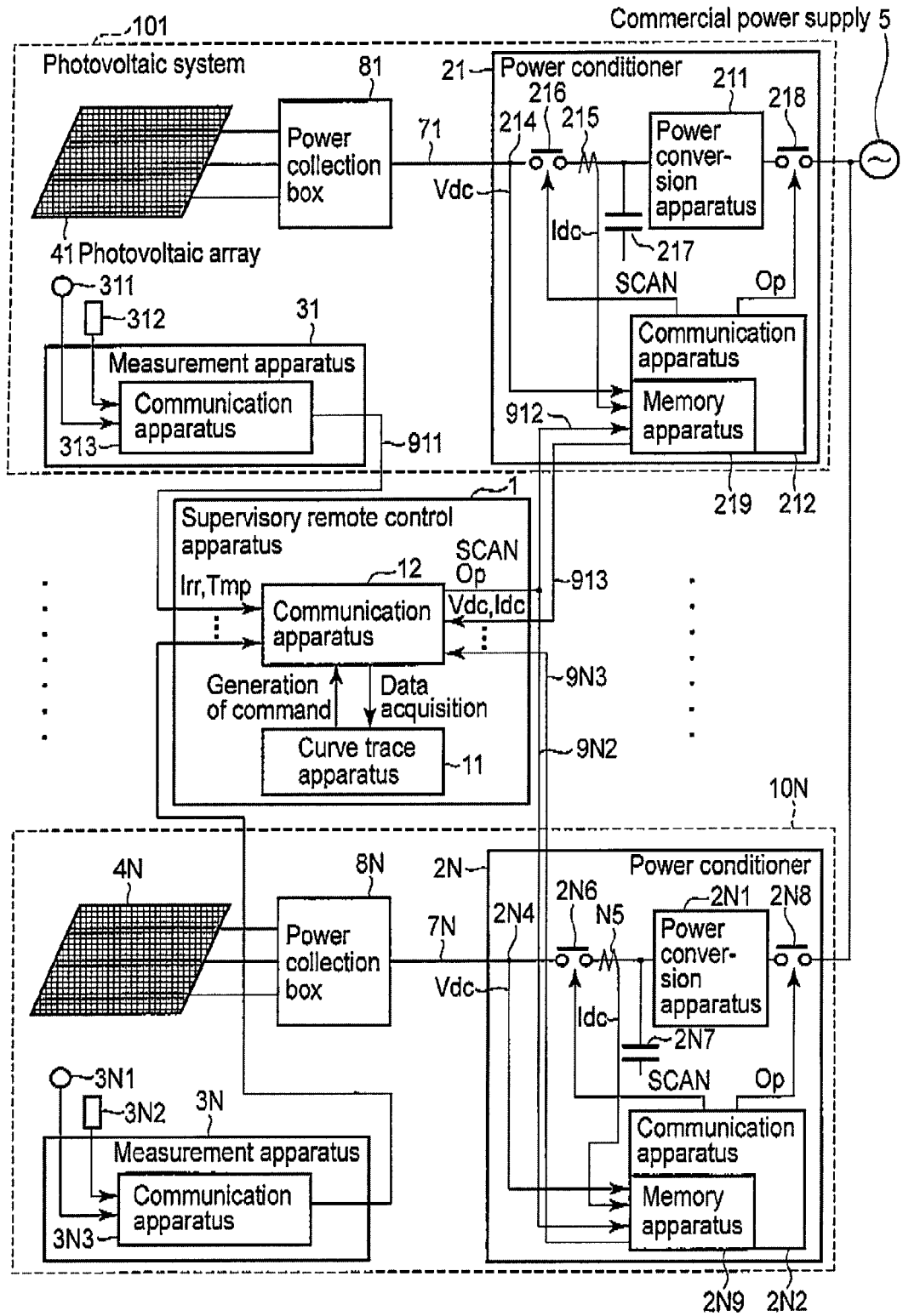
F I G. 12

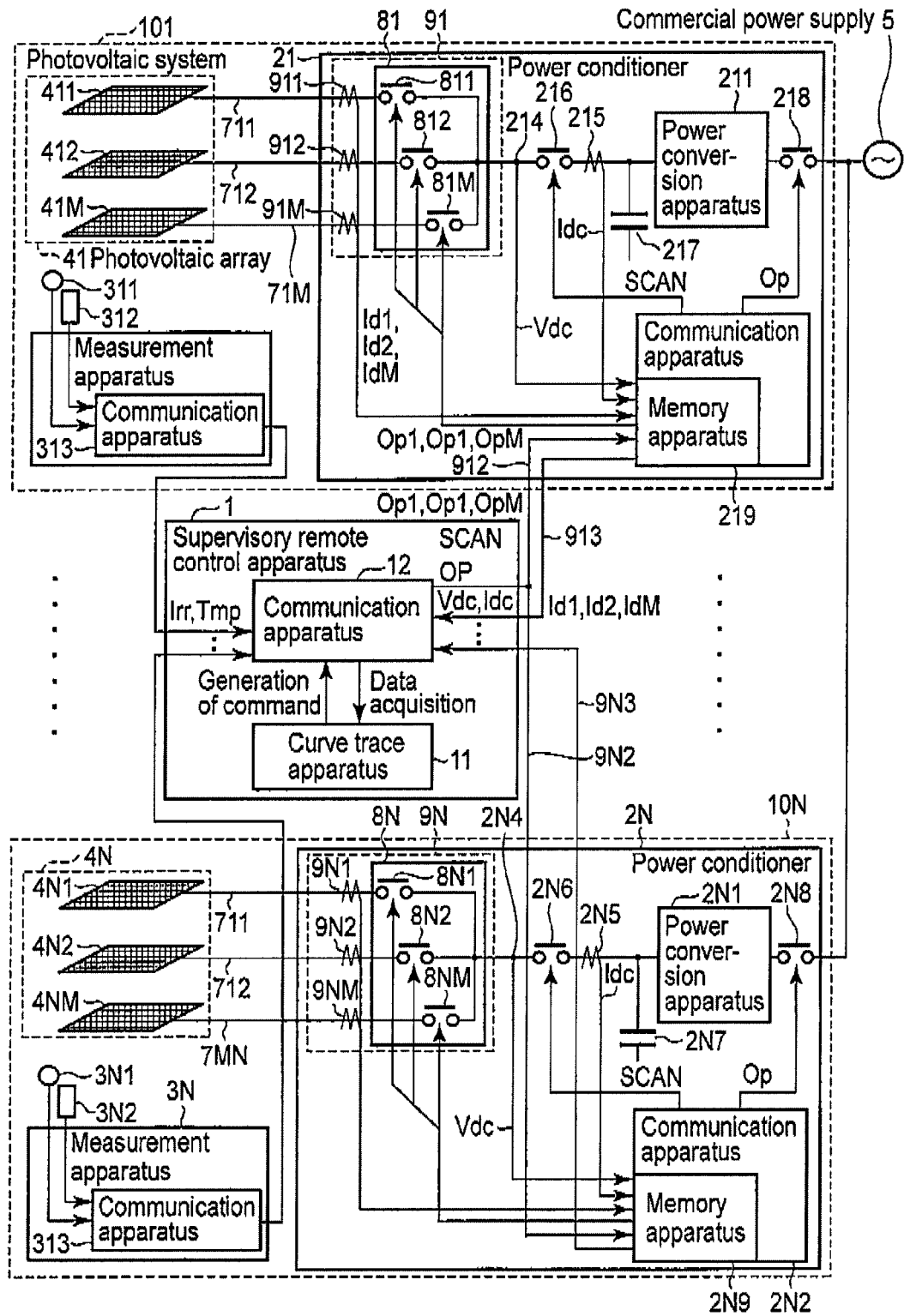
F I G. 13

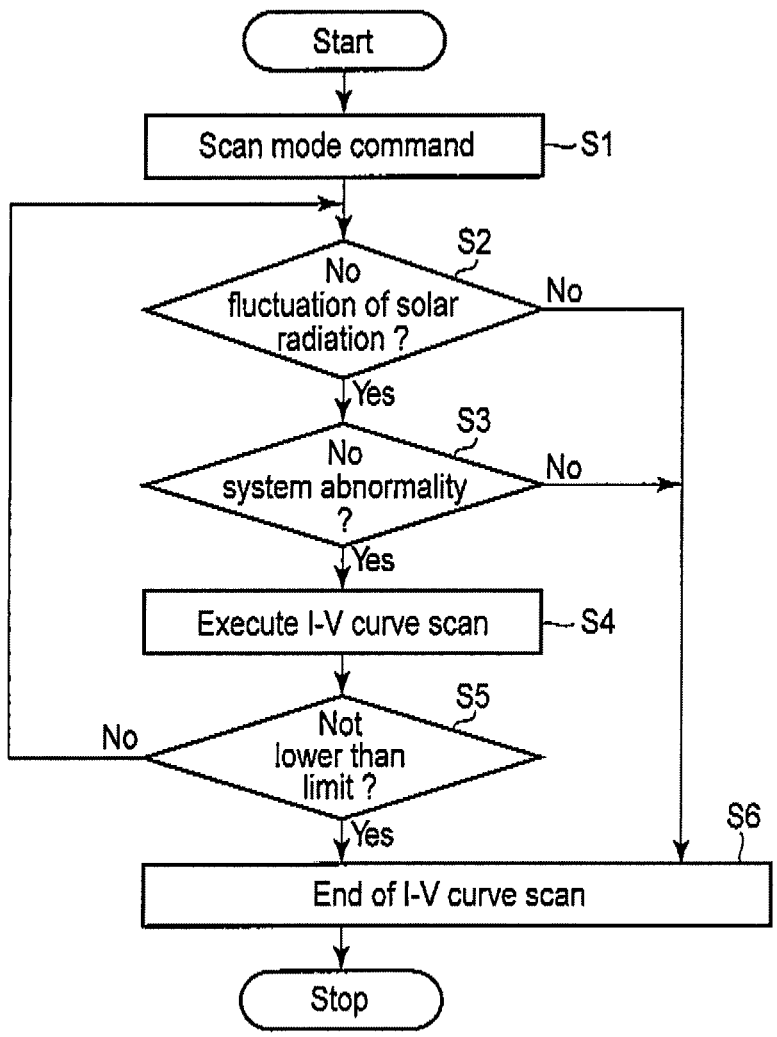
F I G. 1 4

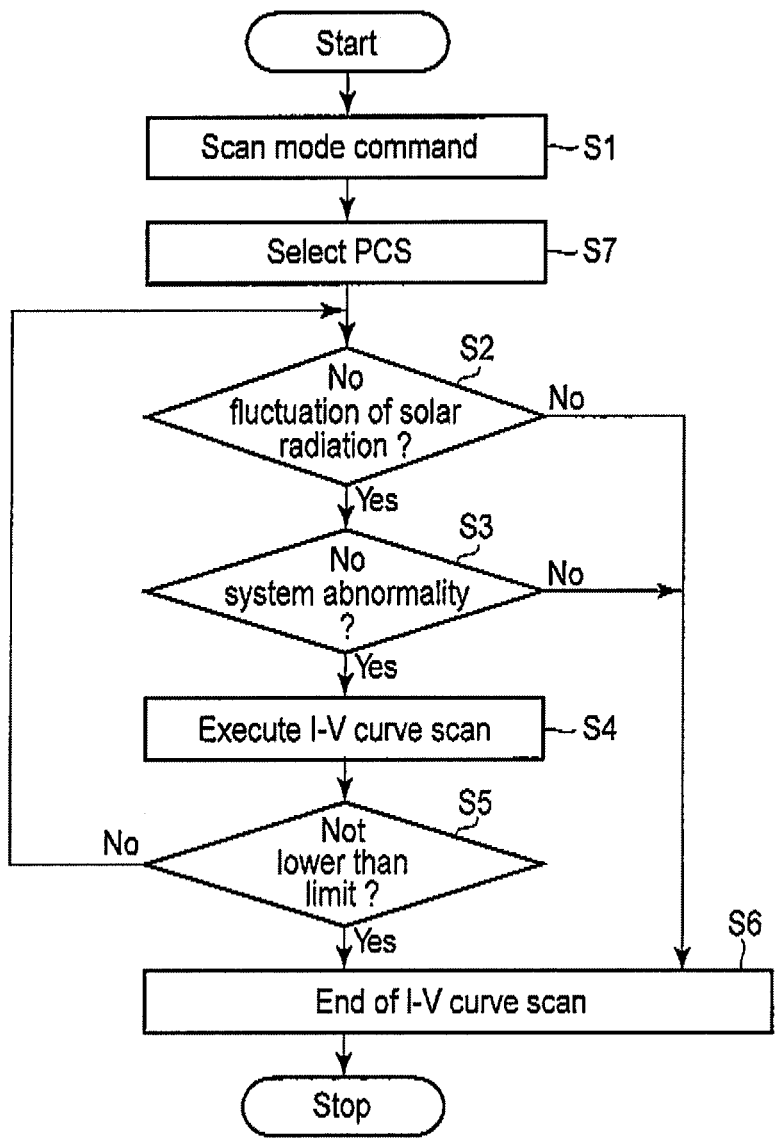
F I G. 1 5

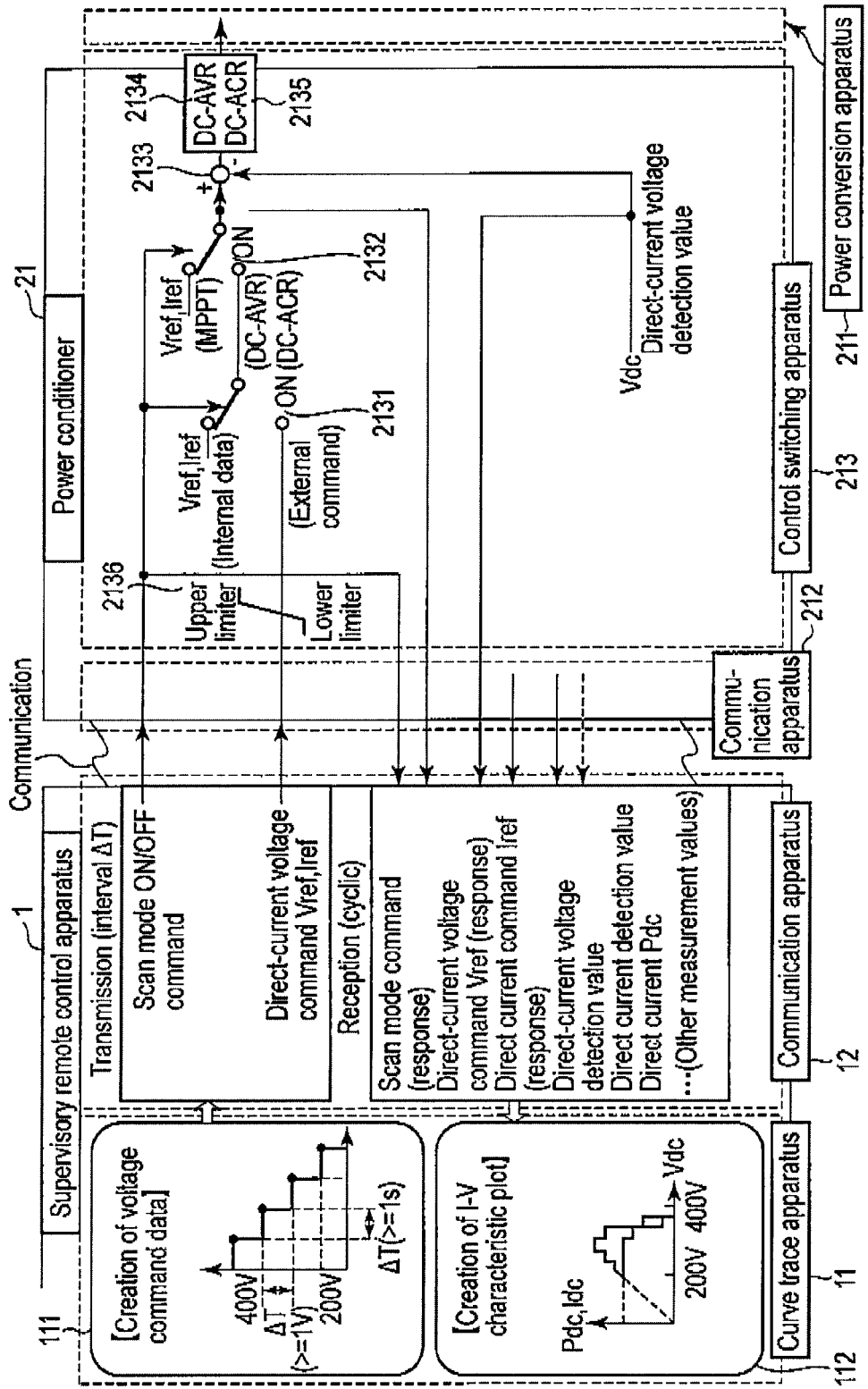
F I G. 16

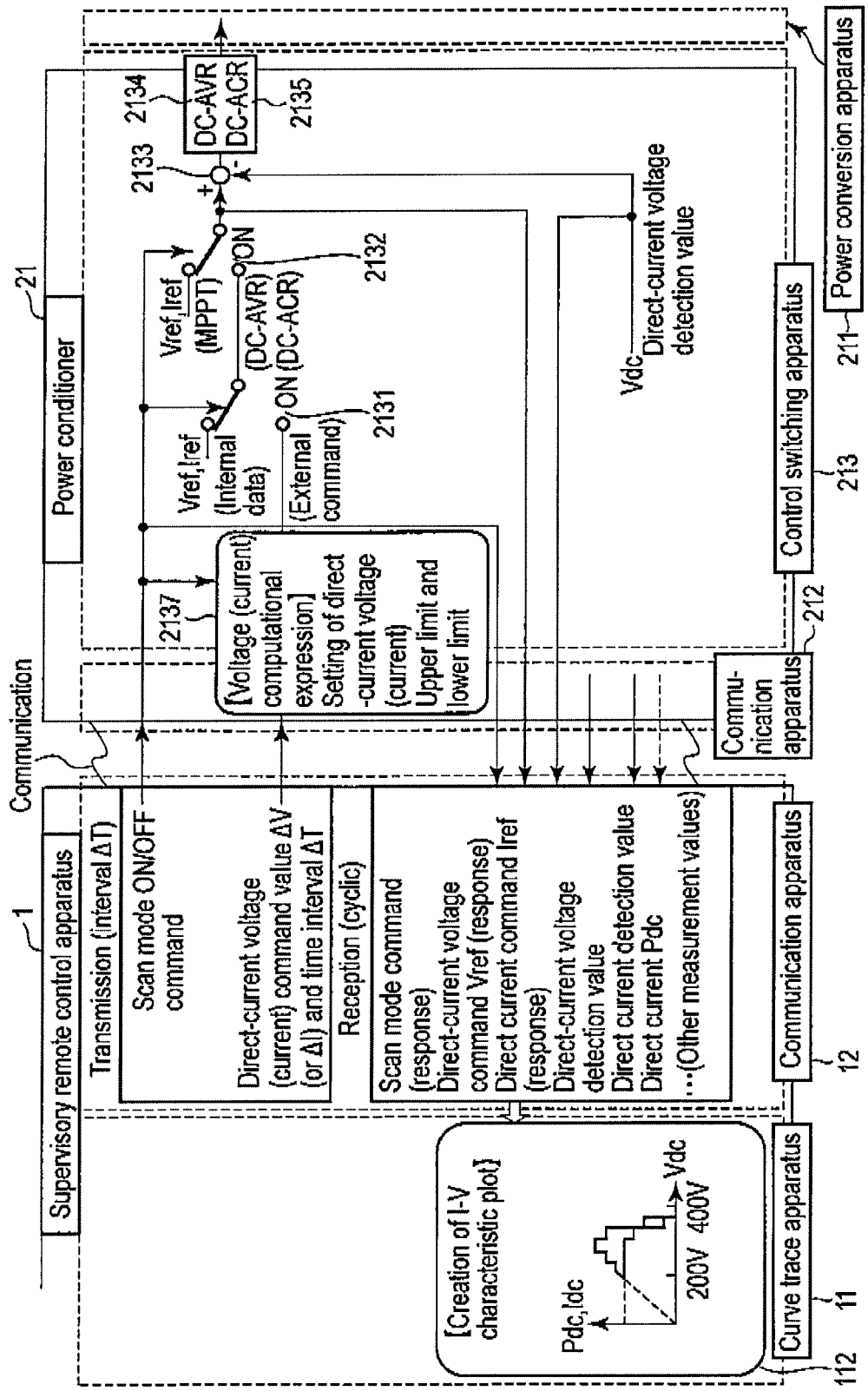
F I G. 17

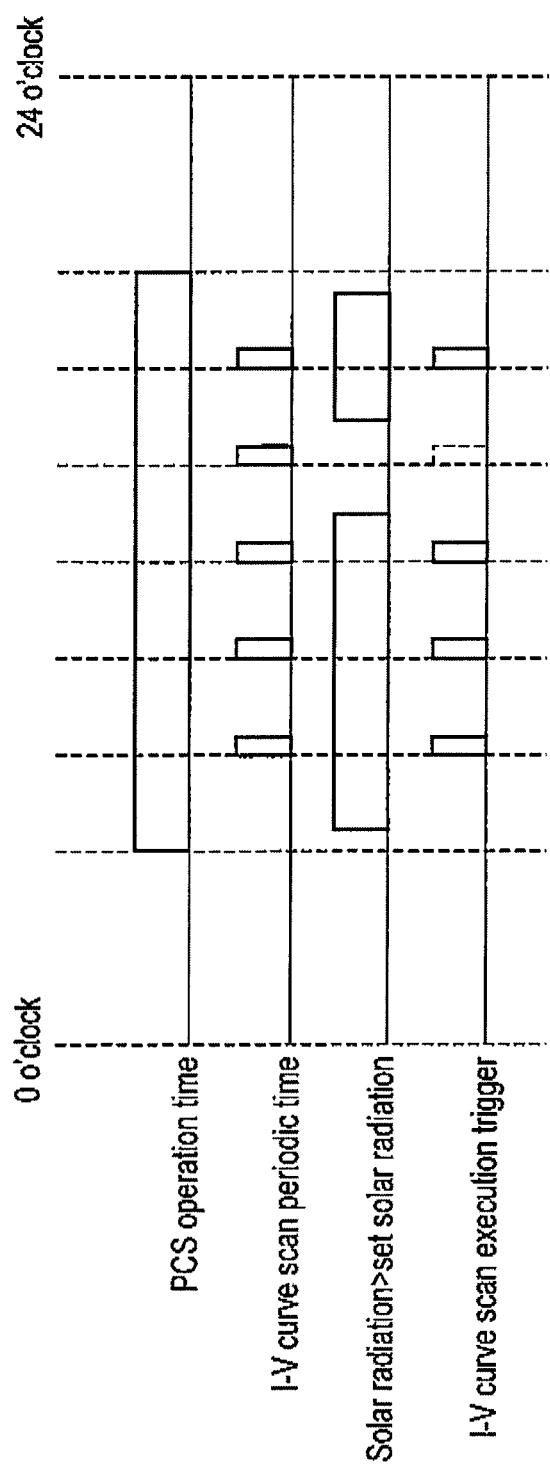
F I G. 18

PHOTOVOLTAIC POWER GENERATION SYSTEM

CROSS-REFERENCE TO RELATED APPLICATIONS

This application is a Continuation application of PCT Application No. PCT/JP2010/053164, filed Feb. 26, 2010, the entire contents of which are incorporated herein by reference.

BACKGROUND OF THE INVENTION

1. Field of the Invention

The present invention relates to a photovoltaic power generation system capable of synchronously obtaining output curve characteristics of a photovoltaic array (a PV array) and power generating conditions using, e.g., a supervisory remote control apparatus in a state that a large-scale photovoltaic power generation system or a clustered grid-connected photovoltaic power generation system is installed on the spot.

2. Description of the Related Art

Patent Literature 1 (Jpn. Pat. Appln. KOKAI Publication No. 2006-201827) discloses a configuration in which a power conditioner has a built-in curve tracer to judge output abnormality of a photovoltaic power generation system in a state that the photovoltaic power generation system is installed in the field.

This curve tracer measures a direct current (I) associated with a direct-current voltage (V) of a photovoltaic cell, traces a direct current (I)-direct-current voltage (V) curve from the measurement values, and displays this trace result in a display unit, whereby visually confirming this display unit enables judging whether the photovoltaic power generation system is normal or abnormal.

In the invention disclosed in Patent Literature 1, solar radiation intensity or an air temperature as power generating conditions for evaluating an output from the photovoltaic power generation system is not traced, and evaluation based on comparison with characteristic estimated value from reference conditions (1 KW/m$^2$, 25° C.) of the photovoltaic cell is difficult.

Further, in a large-scale system including photovoltaic power generation systems, since each power conditioner has the built-in curve tracer, many curve tracers cannot be managed and controlled in synchronization with each other, and evaluation based on comparison with outputs from the photovoltaic power generation systems under the same power generating conditions is difficult.

BRIEF SUMMARY OF THE INVENTION

The present invention provides a photovoltaic power generation system comprising: a photovoltaic array including photovoltaic modules, the photovoltaic power generation system further comprising a control apparatus configured to display output characteristics of the photovoltaic array and power generating conditions of the photovoltaic array in synchronization.

Furthermore, the present invention provides a photovoltaic power generation system comprising: a plurality of photovoltaic arrays, and curve trace apparatuses each of which traces output characteristics of at least a direct current I and a direct-current voltage V as outputs from each of the photovoltaic arrays in accordance with each of the photovoltaic arrays, the photovoltaic power generation system further comprising a control apparatus configured to perform display control of each curve trace apparatus in synchronization.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a schematic block diagram for explaining a first embodiment of a photovoltaic power generation system according to the present invention;

FIG. 2 is a schematic block diagram for explaining a second embodiment of the photovoltaic power generation system according to the present invention;

FIG. 3 is a schematic block diagram for explaining a third embodiment of the photovoltaic power generation system according to the present invention;

FIG. 4 is a schematic block diagram for explaining a fourth embodiment of the photovoltaic power generation system according to the present invention;

FIG. 6 is a schematic block diagram for explaining a sixth embodiment of the photovoltaic power generation system according to the present invention;

FIG. 7 is a schematic block diagram for explaining a seventh embodiment of the photovoltaic power generation system according to the present invention;

FIG. 8 is a schematic block diagram for explaining an eighth embodiment of the photovoltaic power generation system according to the present invention;

FIG. 10 is a schematic block diagram for explaining a 10th embodiment of the photovoltaic power generation system according to the present invention;

FIG. 11 is a schematic block diagram for explaining an 11th embodiment of the photovoltaic power generation system according to the present invention;

FIG. 12 is a schematic block diagram for explaining a 12th embodiment of the photovoltaic power generation system according to the present invention;

FIG. 13 is a schematic block diagram for explaining a 13th embodiment of the photovoltaic power generation system according to the present invention;

FIG. 14 is a flowchart for explaining an operation of the first embodiment of the photovoltaic power generation system according to the present invention;

FIG. 15 is a flowchart for explaining the operation of the first embodiment of the photovoltaic power generation system according to the present invention;

FIG. 16 is an operation explanatory view for explaining of an operation of each unit of the first embodiment in the photovoltaic power generation system according to the present invention;

FIG. 17 is an operation explanatory view for explaining of the operation of each unit of the first embodiment in the photovoltaic power generation system according to the present invention;

FIG. 18 is an operation explanatory view for explaining of the operation of each unit of the first embodiment in the photovoltaic power generation system according to the present invention;

DETAILED DESCRIPTION OF THE INVENTION

Figure 5:
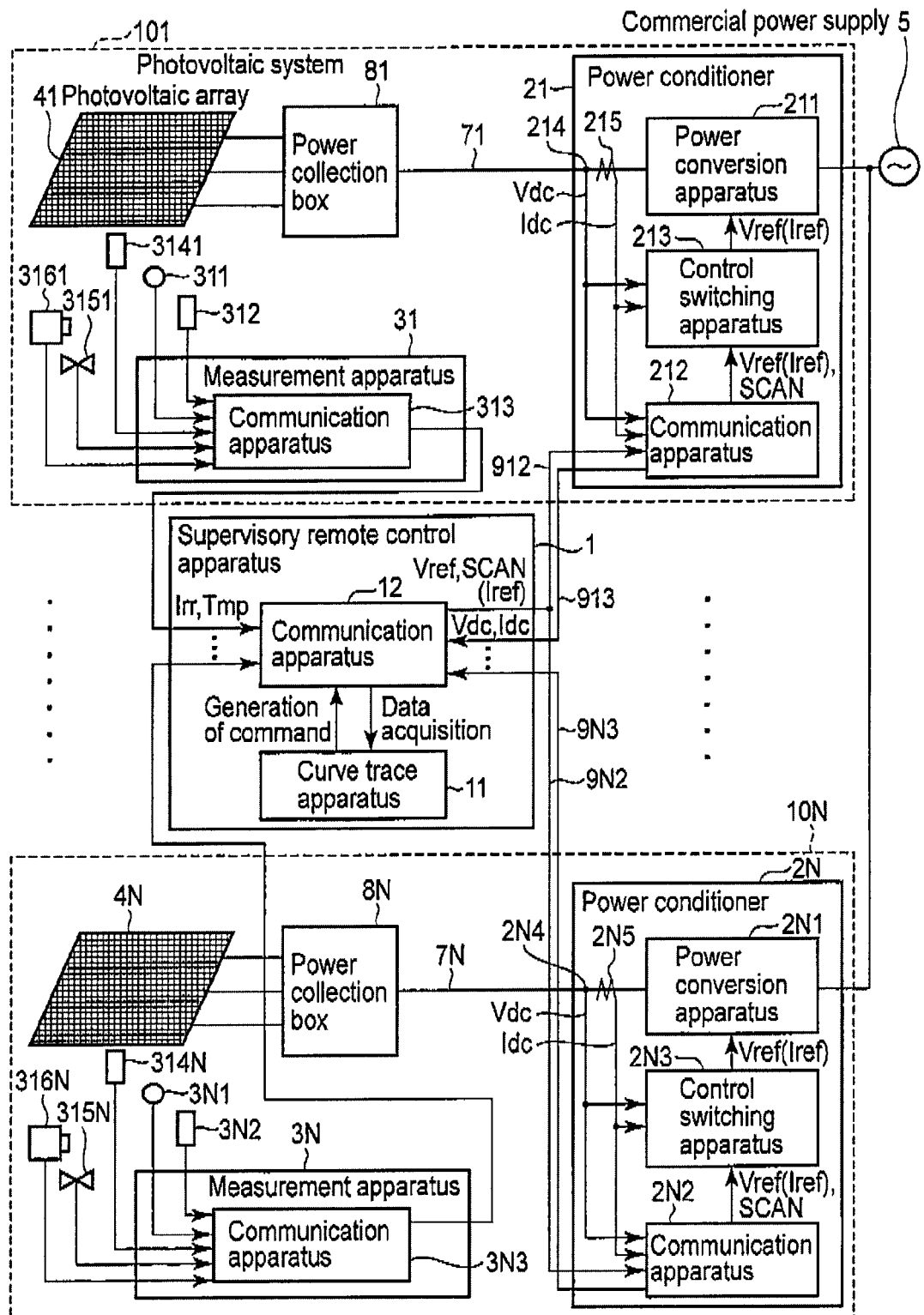
FIG. 5 is a schematic block diagram for explaining a fifth embodiment of the photovoltaic power generation system according to the present invention.

FIG. 1 is a schematic block diagram for explaining a first embodiment of the present invention; this embodiment comprises photovoltaic power generation systems 101 . . . 10N and one supervisory remote control apparatus 1, and direct-current power generated by the respective photovoltaic generation systems 101 . . . 10n is converted into alternating-current power by respective power conditioners 21 . . . 2N and supplied to a commercial power supply (an alternating-current power system) 5. The supervisory remote control apparatus 1 supervises and controls states of the photovoltaic power generation systems 101 . . . 10N.

The photovoltaic power generation system 101 comprises a photovoltaic array 41, the power conditioner 21 that converts the direct-current power generated by the photovoltaic array 41 into the alternating-current power and supplies this power to the alternating-current power system 5, a power collection box 81 and a cable run 71 which are arranged between the photovoltaic array 41 and the power conditioner 21, and a measurement apparatus 31 that measures power generating conditions of the photovoltaic array 41.

Like the photovoltaic power generation system 101, the photovoltaic power generation system 10N comprises one photovoltaic array 4N, the power conditioner 2N that converts the direct-current power generated by the photovoltaic array 4N into the alternating-current power and supplies this power to the alternating-current power system 5, a power collection box 8N and a cable run 7N which are arranged between the photovoltaic array 4N and the power conditioner 2N, and a measurement apparatus 3N that measures power generating conditions of the photovoltaic array 4N.

Here, the photovoltaic array means one obtained by combining photovoltaic cells as a minimum unit of a photovoltaic battery to constitute each photovoltaic module (a photovoltaic panel) and connecting these photovoltaic modules in series, parallel, or series-parallel, one photovoltaic array will be referred to as one group or one unit, and a plurality of photovoltaic arrays will be referred to as groups or units.

Communication apparatuses 12, 212 . . . 2N2, 313 . . . 3N3 are installed in the supervisory remote control apparatus 1, and the power conditions 21 . . . 2N and the measurement apparatuses 31 . . . 3N in the respective groups, thereby providing a communication system comprising signal transmission paths 911 . . . 9N1, 912 . . . 9N2, and 913 . . . 9N3 that enable communication between the communication apparatus 12 of the supervisory remote control apparatus 1 and the communication apparatuses 313 . . . 3N3 of the measurement apparatuses 31 . . . 3N and between the communication apparatus 12 of the supervisory remote control apparatus 1 and the communication apparatuses 212 . . . 2N2 of the respective power conditioners 21 . . . 2N.

The power conditioner 21 comprises a power conversion apparatus 211, a control switching apparatus 213, the communication apparatus 212, a direct-current voltage detector 214 that detects a direct-current voltage as an input to the power conversion apparatus 211 and an output from the photovoltaic array 41 and supplies this direct-current voltage detection value Vdc to the control switching apparatus 213 and the communication apparatus 212, and a direct current detector 215 that detects a direct current as an input to the power conversion apparatus 211 and an output from the photovoltaic array 41 and supplies this direct current detection value Idc to the control switching apparatus 213 and the communication apparatus 212.

The control switching apparatus 213 switches max power point tracking (MPPT) control for controlling in such a manner that the power conditioner 21 can receive a direct-current voltage command Vref or a direct current command Iref and a control switching command SCAN from the supervisory remote control apparatus 1 through the communication system and an output from the power conversion apparatus 211 included in the power conditioner 21 can become maximum for voltage control or current control based on the direct-current voltage command Vref or the direct current command Iref.

Furthermore, like the power conditioner 21, the power conditioner 2N comprises a power conversion apparatus 2N1, a control switching apparatus 2N3, the communication apparatus 2N2, a direct-current voltage detector 2N4 that detects a direct-current voltage as an input to the power conversion apparatus 2N1 and an output from the photovoltaic array 4N and supplies this direct-current voltage detection value Vdc to the control switching apparatus 2N3 and the communication apparatus 2N2, and a direct current detector 215 that detects a direct current as an input to the power conversion apparatus 2N1 and an output from the photovoltaic array 4N and supplies this direct current detection value Idc to the control switching apparatus 2N3 and the communication apparatus 2N2.

The control switching apparatus 2N3 switches the MPPT control for controlling in such a manner that the power conditioner 2N can receive the direct-current voltage command Vref or the direct current command Iref and the control switch command SCAN from the supervisory remote control apparatus 1 through the communication system and an output from the power conversion apparatus 2N1 included in the power conditioner 2N can become maximum to voltage control or current control based on the direct-current voltage command Vref or the direct current command Iref.

The measurement apparatuses 31 . . . 3N have at least one (provided in accordance with each of the photovoltaic arrays 41 . . . 4N in this example) solar radiation intensity detector and the communication apparatuses 313 . . . 3N, the solar radiation intensity detector including actinometers 311 . . . 3N1 that measure solar radiation intensity as power generating conditions of the respective photovoltaic arrays 41 . . . 4N and air temperature gauges 312 . . . 3N2 that detect and measure air temperatures at places where the photovoltaic arrays 41 . . . 4N are installed.

The supervisory remote control apparatus 1 comprises a later-described curve trace apparatus 11 and the communication apparatus 12. The curve trace apparatus 11 is installed in the supervisory remote control apparatus 1, fetches direct current detection values (I) detected by the respective direct current detectors 215 . . . 2N5 included in the respective power conditioners 21 . . . 2N and direct-current voltage values (V) detected by the respective direct-current voltage detectors 214 . . . 2N4 included in the respective power conditioners 21 . . . 2N, thereby traces I-V characteristic diagrams for the respective photovoltaic arrays 41 . . . 4N, and traces the solar radiation intensity detection values and air temperature detection values detected by the measurement apparatuses 31 . . . 3N in the I-V characteristic diagrams for the respective photovoltaic arrays 41 . . . 4N; tracing of the I-V characteristic diagrams for the respective photovoltaic arrays 41 . . . 4N, the solar radiation intensity detection values, and the air temperature detection values is carried out in synchronization with transmission of the direct-current voltage command Vref or the direct current command Iref given to the control switching apparatuses 213 . . . 2N3 included in the respective power conditioners 21 . . . 2N and the control switching command SCAN to the control switching apparatuses 213 . . . 2N3 included in the respective power conditioners 21 . . . 2N from the supervisory remote control apparatus 1 through the communication system, i.e., the communication apparatus 12, the signal transmission paths 912 . . . 9N2, and the communication apparatuses 212 . . . 2N2.

The power collection boxes 81 . . . 8N accommodate diodes that prevent outputs from the photovoltaic arrays 41 . . . 4N from flowing back to a plurality of (three in this embodiment) photovoltaic modules constituting the respective photovoltaic arrays 41 . . . 4N, switches used when performing maintenance and inspection of the photovoltaic power generation system, and others.

Although a flow of signals between the supervisory remote control apparatus 1 and the power conditioners 21 . . . N1 (21 of these power conditioners) will now be described with reference to FIG. 16 and FIG. 17, the power collection box 81 in FIG. 1 is omitted in both the drawings.

FIG. 16 shows that I-V curve scan command data is executed based on a sampling system. The curve trace apparatus 11 included in the supervisory remote control apparatus 1 comprises a command data creation apparatus 111 and an I-V characteristic plot creation apparatus 112.

The command data creation apparatus 111 creates command data in accordance with a scan mode ON/OFF command, the direct-current voltage command Vref or the direct current command Iref, and a cycle $\Delta T$, e.g., every 1 second in response to the control switching command SCAN, and thereby sets a direct-current voltage command value (a direct current command value).

The communication apparatus 12 transmits the direct-current voltage command value or the direct current command value set by the command data creation apparatus 111 to the communication apparatus 212 of the power conditioner 21 through a signal transmission path. The direct-current voltage command value (the direct current command value) is supplied to the power conditioner 21 in accordance with the cycle received by the communication apparatus 212. When the scan mode is changed to ON, the control switching apparatus 213 of the power conditioner 21 inputs the direct-current voltage command value or the direct current command value as an external command to the power conditioner 21 in accordance with the cycle received through the communication and performs the I-V curve scan. Further, the communication apparatus 212 transmits (returns) the direct-current voltage command (the direct-current voltage command) from the control switching apparatus 213, the direct-current voltage detection value and the direct current detection value detected by the detector, and direct-current power calculated based on these values to the communication apparatus 212, and the I-V characteristic plot creation apparatus 11 creates an I-V characteristic plot.

FIG. 17 shows that the I-V curve scan command data is executed based on a collective system. Although the curve trace apparatus 11 included in the supervisory remote control apparatus 1 comprises the I-V characteristic plot creation apparatus 112, it does not comprise a command data creation apparatus, and it is configured to perform output in accordance with the scan mode ON/OFF command, the direct-current voltage command value or the direct current command value, and the cycle $\Delta$, e.g., 1 second. The power conditioner 21 comprises a setting unit 2137 so that a direct-current voltage command computational expression or a direct current command computational expression can be set. The control switching apparatus 213 in the power conditioner 21 performs the I-V curve scan based on the communication when the scan mode is changed to ON, inputs the voltage command, the current command, and the cycle command to the command computational expression, thereby calculating an external command based on the command computational expression. The thus obtained direct-current voltage command or direct current command is returned to the supervisory remote control apparatus 1 by the communication apparatus, and the I-V characteristic plot creation apparatus 11 creates an characteristic plot.

The above-described operation of the curve trace apparatus 1 is carried out as shown in FIG. 14 or FIG. 15, and I-V curve scan is stopped if solar radiation fluctuates during the I-V curve scan in any case. Specifically, in FIG. 14, for example, when a scan mode command Vref_scan or Iref_scan is issued to the power conditioner 21 from the voltage command data creation apparatus 111 in FIG. 1 and FIG. 16 (S1), whether solar radiation intensity measured by the actinometers 311 ... 3N1 has fluctuated is judged (S2), and the I-V curve scan is terminated when the solar radiation has fluctuated (S6). When there is no fluctuation in solar radiation at S2, whether system abnormality is observed is judged (S3), and the I-V curve scan is terminated when the system abnormality is observed (S6). If the system abnormality is not observed at S3, the I-V curve scan is executed (S4), and whether this scan value is not smaller than a limit is judged (S5). If this value is not smaller than the limit at S5, the I-V curve scan is terminated (S6). When this value is not smaller than the limit at S6, the control returns to S2, and whether solar radiation has fluctuated is judged. It is to be noted that, at S6, the I-V curve scan is continued if the scan voltage Vref_scan or the scan current Iref_scan11 is not equal to or larger than a set limit Vdclimit or Idc_limit, and the I-V curve scan is terminated if the same voltage or current is equal to or above a limit Vdclimit or Idc_limit.

Like FIG. 14, the I-V curve scan is carried out as shown in FIG. 15. When solar radiation fluctuates during the I-V curve scan, the I-V curve scan is stopped. FIG. 15 shows an example of moving the I-V curve scan in accordance with each group, and a step of making a selection from the power conditioners 21 ... 2N is added between S1 and S2 in FIG. 14. As this selection, an odd number, an even number, a string converter on the photovoltaic (PV) module side, or the like is freely selected. Steps other than one described above are equal to those in FIG. 14, and hence like reference numerals denote like parts to omit a description thereof.

FIG. 18 illustrates operation times for executing the I-V curve scan in a day. In FIG. 18, a PCS operation time means a time during which the PCS operates in a day. An I-V curve scan periodic time means a time during which the I-V curve scan is periodically executed in the PCS operation time. In regard to solar radiation>set solar radiation and an I-V curve scan execution trigger, the I-V curve scan execution trigger is output when solar radiation is larger than the set solar radiation in the periodic time, but the I-V curve scan execution trigger is not output when solar radiation is smaller than the set solar radiation. When this concept shown in FIG. 18 is expanded and a function for making reference to external data, e.g., a function for fetching information such as a weather forecast is added, curve tracing that is efficient for determining a measurement schedule is enabled.

According to the first embodiment, since solar radiation intensity or an air temperature as measurement conditions for evaluating an output from the photovoltaic power generation system is drawn in the characteristic diagram traced by the curve trace apparatus 11, evaluation based on comparison with a characteristic estimated value under the reference conditions (1 KW/m², 25° C.) of the photovoltaic cell can be easily performed.

Further, according to the first embodiment, in the large-scale system including the photovoltaic power generation systems, I-V curves and/or P-V curves in the photovoltaic arrays 41 ... 4N can be managed and controlled in synchronization with each other by the supervisory remote control apparatus 1, and evaluation based on comparison of outputs from the photovoltaic power generation systems under the same power generating conditions can be easily carried out.

Furthermore, since output curve characteristics of the photovoltaic arrays 41 ... 4N and the power generating conditions are obtained in synchronization with each other by the supervisory remote control apparatus 1 in a state that the photovoltaic power generation system is installed on the spot, the photovoltaic arrays 41 ... 4N can be readily evaluated.

Moreover, it is possible to perform a deterioration analysis of the photovoltaic arrays 41 ... 4N, a characteristic analysis of long-term operations of the power conditioners (PCS) 21 ... 2N, and determination of an accurate maximum power point.

Additionally, an impact diagnosis of an environment of the photovoltaic arrays 41 ... 4N, solar radiation based on installation conditions, an air temperature, and sun shadow can be carried out, and deterioration of the photovoltaic arrays 41 ... 4N or fouling due to dust or stains can be also analyzed.

Further, it is possible to perform an impact diagnosis of a voltage drop due to a wiring impedance between the respective photovoltaic arrays 41 ... 4N and the respective power conditioners 21 ... 2N or a characteristic analysis of operations of the power conditioners 21 ... 2N; specifically, control performance of a maximum power point tracing apparatus (MPPT), loss evaluation, and an age deterioration analysis.

The following points, which are problems in Patent Literature 1, can be improved upon. That is, it is possible to make an impact diagnosis of an environment of the photovoltaic arrays 41 ... 4N and solar radiation, an air temperature, and sun shadow meeting the installation conditions. Furthermore, data of the photovoltaic power generation systems 101 ... 10N can be synchronously obtained, and comparison and evaluation of characteristics can be easily carried out. Moreover, output curve characteristics of the photovoltaic arrays 41 ... 4N and power generating conditions can be synchronously obtained by the supervisory remote control apparatus 1.

FIG. 2 is a schematic block diagram for explaining a second embodiment of the present invention, and it is different from the embodiment depicted in FIG. 1 in that one measurement apparatus 30 having an actinometer 301 and an air temperature gauge 302 is provided to a specific one of the photovoltaic arrays 41 ... 4N or one position other than this place, whereas each of the measurement apparatuses 31 ... 3N having actinometers 311 ... 3N1 and the air temperature gauges 312 ... 3N2 as one of the power generating conditions is provided in accordance with each of the photovoltaic arrays 41 ... 4N in the embodiment depicted in FIG. 1. A solar radiation intensity detection value Irr obtained by actinometer 301 and an air temperature detection value Tmp obtained by the air temperature gauge 302 measured by the measurement apparatus 30 are transmitted to a curve trace apparatus 11 through a communication apparatus 303 included in the measurement apparatus 30, a communication apparatus 12 included in a supervisory remote control apparatus 1, and a signal transmission path connecting these apparatuses.

FIG. 3 is a schematic block diagram for explaining a third embodiment according to the present invention, and it is different from the embodiment depicted in FIG. 1 in that power collection box apparatuses 91 ... 9N comprising power collection boxes 81 ... 8N and direct current detectors 911, 912 ... 91M, ... 9N1, 9N2 ... 9NM are newly provided in place of the power collection boxes 81 ... 8N, and the power collection box apparatuses 91 ... 9N are configured as follows. That is, the direct current detectors 911, 912 ... 91M, ... 9N1, 9N2 ... 9NM are provided at connecting points of photovoltaic modules 411, 412 ... 41M, ... 4N1, 4N2 ... 4NM constituting respective photovoltaic arrays 41 ... 4N and the power collection boxes 81 ... 8N, direct-current voltage detectors 910 ... 9M0 are newly provided at a connecting point of the power collection box 81 and a power conditioner 21 and a connecting point of the power collection box 8N and the power conditioner 2N, and detection values obtained by the direct current detectors 911, 912 . . . 91M, . . . 9N1, 9N2 . . . 9NM and detection values of the direct-current voltage detectors 910 . . . 9M0 are input to a curve trace apparatus 11 through communication apparatuses 313 and 12.

According to the third embodiment, I-V curve scan for each photovoltaic module and each photovoltaic array can be carried out by the curve trace apparatus 11.

FIG. 4 is a schematic block diagram for explaining a fourth embodiment of the present invention, and it is different from the embodiment depicted in FIG. 1 in that the measurement apparatuses 31 . . . 3N are not provided and solar radiation intensity detection values and air temperature detection values measured by actinometers 311 . . . 3N1 and air temperature gauges 312 . . . 3N2 are input to a curve trace apparatus 11 through communication apparatuses 212 . . . 2N2 and a communication apparatus 12. This embodiment can be applied to a clustered grid-connected photovoltaic system, e.g., a residential photovoltaic system.

FIG. 5 is a schematic block diagram for explaining a fifth embodiment according to the present invention, and it is different from the embodiment depicted in FIG. 1 in that industrial cameras 3161 . . . 316N that enable visually confirming a solar radiation environment of array or module installing positions and anemometers 3151 . . . 315N that measure wind velocities are newly added as measurement apparatuses 31 . . . 3N that detect power generating conditions, respectively.

When the industrial cameras 3161 . . . 316N and the anemometers 3151 . . . 315N are newly provided in this manner, an accuracy for scan evaluation of photovoltaic characteristics measurement conditions can be improved.

FIG. 6 is a schematic block diagram for explaining a sixth embodiment of the present invention, and it is different from the embodiment depicted in FIG. 1 in that alternating-current voltage detectors 216 . . . 2N6 and alternating current detectors 217 . . . 2N7 are newly provided on output sides of respective power conversion apparatuses 211 . . . 2N1, alternating-current power arithmetic units 218 . . . 2N8 that calculate alternating-current power based on these alternating-current detection values are provided, and calculated values of the alternating-current power arithmetic units 218 . . . 2N8 are led to a curve trace apparatus 11 through communication apparatuses 212 . . . 2N2 and 12. As a result, in the curve trace apparatus 11, since a characteristic diagram of the direct-current power and a characteristic diagram of the alternating-current power can be simultaneously displayed, characteristics of the photovoltaic power generation system including the power conditioners 21 . . . 2N can be evaluated.

FIG. 7 is a schematic block diagram for explaining a seventh embodiment according to the present invention, and it is different from the embodiment depicted in FIG. 1 in that the power collection boxes 81 . . . 8N are not provided, but new power collection box apparatuses 91 . . . 9N are provided in power conditioners 21 . . . 2N, and the power collection box apparatuses 91 . . . 9N are configured as follows. That is, to detect a direct current of each module constituting the array, direct current detectors 911, 912, . . . 91M . . . 9N1, 9N2, . . . 9NM are provided to direct-current bus lines 711, 712, . . . 71M . . . 7N1, 7N2, . . . 7NM connecting the respective modules to power collection boxes 81 . . . 8N, and the direct current detectors 911, 912, . . . 91M . . . 9N1, 9N2, . . . 9NM and the power collection boxes 81 . . . 8N are provided in the power conditioners 21 . . . 21N, respectively.

FIG. 8 is a schematic block diagram for explaining an eighth embodiment according to the present invention, and it is different from the embodiment depicted in FIG. 1 in that the power collection boxes 81 . . . 8N are not provided, but new power collection box apparatuses 91 . . . 9N are provided, and the power collection box apparatuses 91 . . . 9N are configured as follows. That is, they are provided to direct-current bus lines 71 . . . 7N of the respective modules constituting an array and power conditioners 21 . . . 2N, and the power collection box apparatuses 91 . . . 9N are configured as follows. That is, to detect a direct current for each of modules 411, 412, . . . 41M . . . 4N1, 4N2, . . . 4NM constituting the array, direct current detectors 911, 912, . . . 91M . . . 9N1, 9N2, . . . 9NM are provided to the direct-current bus lines 71 . . . 7N connecting the respective modules to the power collection boxes 8N, switches 811, 812 . . . 81M, 8N1, 8N2 . . . and 8NM are connected to the direct current detectors 911, 912, . . . 91M . . . 9N1, 9N2, . . . 9NM in series in the power collection boxes 81 . . . 8N, and a curve trace apparatus 11 of a supervisory remote control apparatus 1 is configured to enable selecting operations of the switches 811, 812 . . . 81M, 8N1, 8N2 . . . 8NM through communication apparatuses 31 . . . 3N, and 12.

Figure 9:
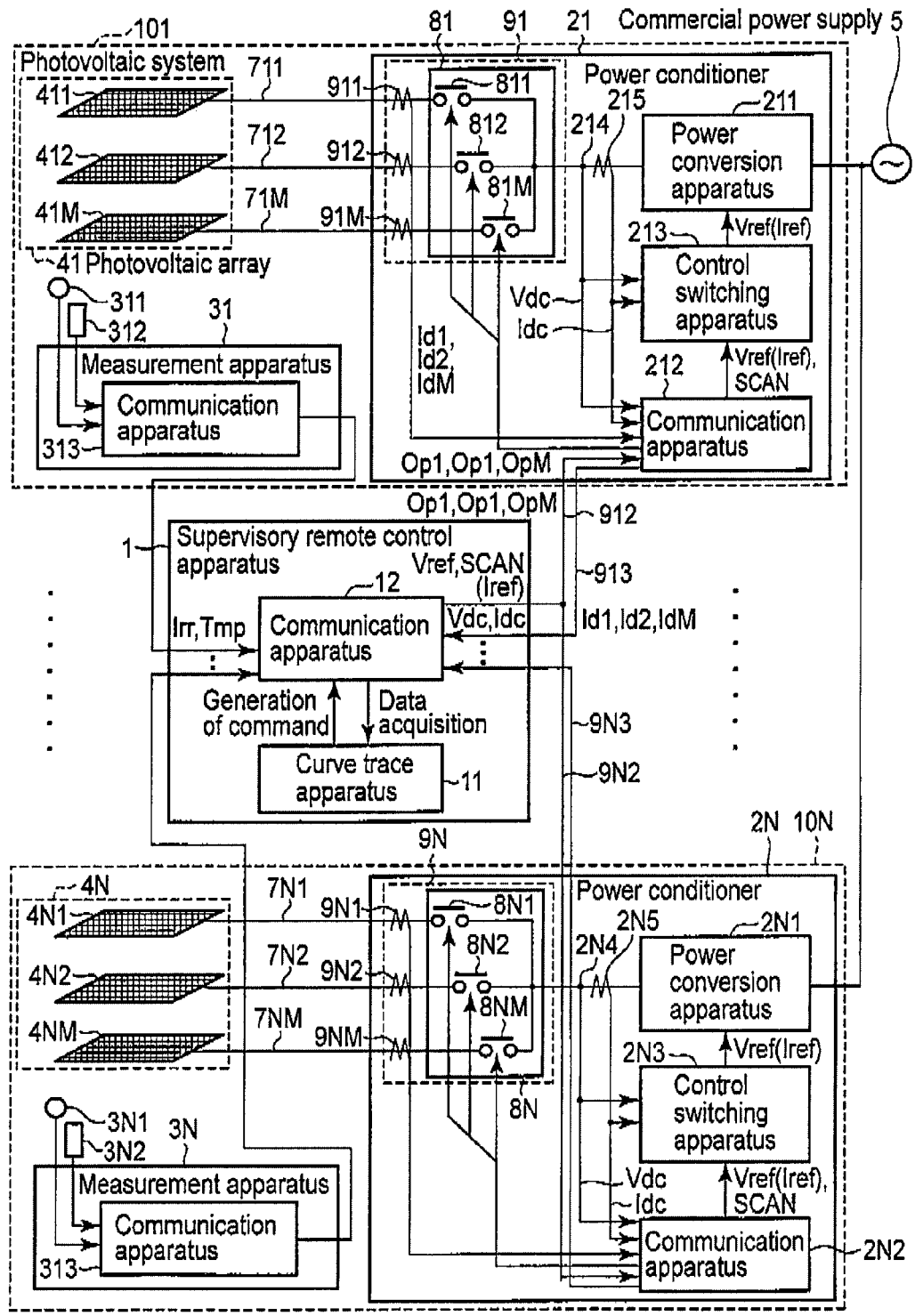
FIG. 9 is a schematic block diagram for explaining a ninth embodiment of the photovoltaic power generation system according to the present invention.

FIG. 9 is a schematic block diagram for explaining a ninth embodiment according to the present invention, and it is different from the embodiment shown in FIG. 1 in that the power collection boxes 81 . . . 8N are not provided, but new power collection box apparatuses 91 . . . 9N are provided in power conditioners 21 . . . 2N, and the power collection box apparatuses 91 . . . 9N are configured as follows. That is, to detect a direct current of each module constituting an array, direct current detectors 911, 912, . . . 91M . . . 9N1, 9N2, . . . 9NM are provided to direct-current bus lines 711, 712, . . . 71M . . . 7N1, 7N2, . . . 7NM connecting the respective modules to the power collection boxes 81 . . . 8N, the direct current detectors 911, 912, . . . 91M . . . 9N1, 9N2, . . . 9NM and the power collection boxes 81 . . . 8N are provided in power conditioners 21 . . . 2N, switches 811, 812 . . . 81M, 8N1, 8N2 . . . 8NM are connected to the direct current detectors 911, 912, . . . 91M . . . 9N1, 9N2, . . . 9NM in series in the power collection boxes 81 . . . 8N, and a curve trace apparatus 11 of a supervisory remote control apparatus 1 is configured to enable selecting operations of the switches 811, 812 . . . 81M, 8N1, 8N2 . . . 8NM through communication apparatuses 212 . . . 2N2, and 12.

FIG. 10 is a schematic block diagram for explaining a 10th embodiment according to the present invention, and it is different from the embodiment depicted in FIG. 1 in that the power conditioners 21 . . . 2N provided to the direct-current bus lines 71 . . . 7N of the power collection boxes 81 . . . 8N and the power system (the commercial power supply) 5 in FIG. 1 are not provided, and they are provided to direct current cable runs between arrays or modules 41' . . . 4N7' and the power collection boxes 81 . . . 8N, one measurement apparatus 30 having an actinometer 301 and an air temperature gauge 302 is arranged at a specific one of photovoltaic arrays 41 . . . 4N or one position other than this location, whereas the measurement apparatuses 31 . . . 3N having the actinometers 311 and the air temperature gauges 312 . . . 3N2 as one of power generating conditions are provided in accordance with the respective photovoltaic arrays 41 . . . 4N in the embodiment shown in FIG. 1.

FIG. 11 is a schematic block diagram for explaining an 11th embodiment according to the present invention, and it is different from the embodiment depicted in FIG. 1 in that the following configuration is adopted so that initial charging of smoothing capacitors 217 . . . 2N7 usually provided on input sides of the power conversion apparatuses 211 . . . 2N1 of the power conditioners 21 ... 2N in FIG. 1 can be carried out in synchronization. That is, switches 216 ... 2N6 and 218 ... 2N8 are provided on input sides and output sides of power conversion apparatuses 211 ... 2N1, and the switches 216 ... 2N6 and 218 ... 2N8 are controlled to be opened or closed by a curve trace apparatus 11 through communication apparatuses 212 ... 2N2 and 12, thereby performing the initial charging of the smoothing capacitors 217 ... 2N7 in synchronization.

FIG. 12 is a schematic block diagram for explaining a 12th embodiment according to the present invention, and it is different from the embodiment depicted in FIG. 1 in that the following configuration is adopted so that initial charging of smoothing capacitors 217 ... 2N7 usually provided on input sides of the power conversion apparatuses 211 ... 2N1 of the power conditioners 21 ... 2N in FIG. 1 can be carried out in synchronization. That is, recording apparatuses 219 ... 2N9 that temporarily record detection values detected by direct-current voltage detectors 214 ... 2N4 and direct current detectors 215 ... 2N5 required for scanning an I-V curve are provided to, e.g., communication apparatuses 212 ... 2N2 of the power conditioners 21 ... 2N, direct-current voltage detection values and direct current detection values recorded by the recording apparatuses 219 ... 2N9 are read out by a curve trace apparatus 11 through the communication apparatuses 212 ... 2N2 and 12, and the I-V curve is scanned based on these values. Adopting such a configuration enables scanning the I-V curve even if operations of switches 216 ... 2N6 are slowed down.

FIG. 13 is a schematic block diagram for explaining a 13th embodiment according to the present invention, and it is different from the embodiment depicted in FIG. 1 in that the power collection boxes 81 ... 8N in FIG. 1 are not provided, but new power collection box apparatuses 91 ... 9N are provided in power conditioners 21 ... 2N, and the following configuration is adopted so that initial charging of smoothing capacitors 217 ... 2N7 usually provided on input sides of power conversion apparatuses 211 ... 2N1 of the power conditioners 21 ... 2N in FIG. 1 can be carried out in synchronization. That is, the power collection box apparatuses 91 ... 9N are configured as follows.

That is, to detect a direct current of each module constituting an array, direct current detectors 911, 912, ... 91M ... 9N1, 9N2, ... 9NM are provided to direct current bus lines 711, 712, ... 71M ... 7N1, 7N2, ... 7NM connecting the respective modules to the power collection boxes 81 ... 8N, the direct current detectors 911, 912, ... 91M ... 9N1, 9N2, ... 9NM and the power collection boxes 81 ... 8N are provided in the respective power conditioners 21 ... 2N, switches 811, 812 ... 81M and 8N1, 8N2 ... 8NM are connected to the direct current detectors 911, 912, ... 91M ... 9N1, 9N2, ... 9NM in series in the power collection boxes 81 ... 8N, and a curve trace apparatus 11 of a supervisory remote control apparatus 1 is configured to enable selecting operations of the switches 811, 812 ... 81M and 8N1, 8N2 ... 8NM through communication apparatuses 212 ... 2N2, 12.

Further, switches 216 ... 2N6 and 218 ... 2N8 are provided on input sides and output sides of the power conversion apparatuses 211 ... 2N1, and the switches 216 ... 2N6 and 218 ... 2N8 are controlled to be opened or closed by the curve trace apparatus 11 through the communication apparatuses 212 ... 2N2 and 12, thereby performing the initial charge of the smoothing capacitors 217 ... 2N7 in synchronization.

Figure 19A:
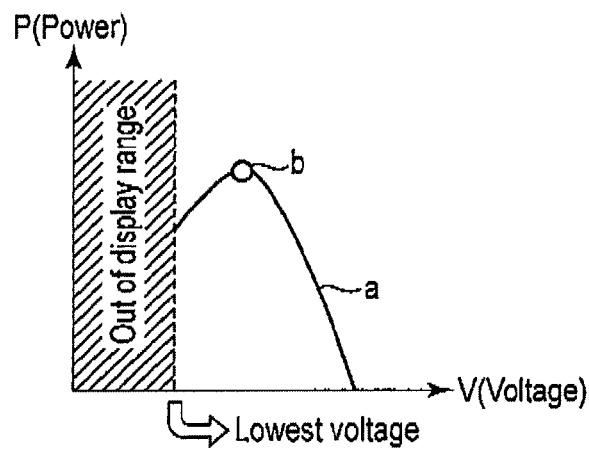
FIG. 19A is a view for explaining a display method of a display apparatus that displays an output from a curve trace apparatus in the photovoltaic power generation system according to the present invention.
Figure 19B:
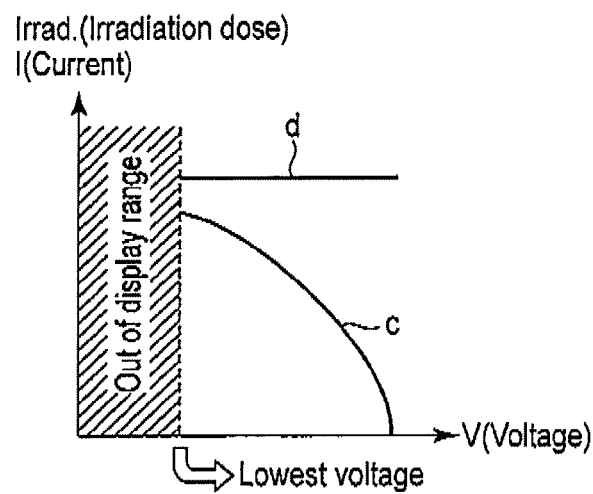
FIG. 19B is a view for explaining the display method of the display apparatus that displays an output from a curve trace apparatus in the photovoltaic power generation system according to the present invention.
Figure 19C:
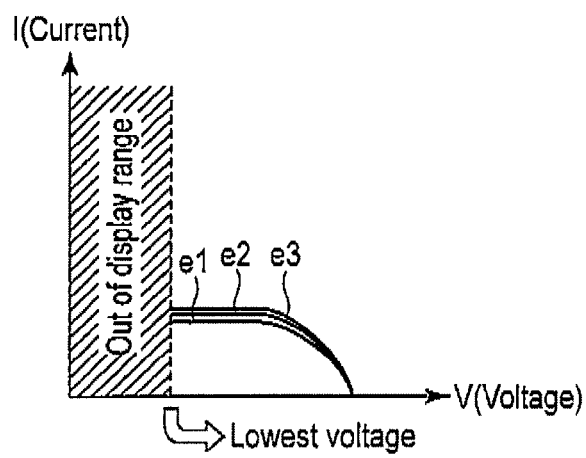
FIG. 19C is a view for explaining the display method of the display apparatus that displays an output from a curve trace apparatus in the photovoltaic power generation system according to the present invention.

A description will now be given as to a display method of a non-illustrated display apparatus included in the curve trace apparatus 11 provided in the supervisory remote control apparatus 1 or a non-illustrated display apparatus included in the curve trace apparatus 11 and non-illustrated display apparatuses provided in the power conditioners 21 ... 2N with reference to FIG. 19A to FIG. 24. Each of FIG. 19A to FIG. 21 shows a display example when the number of the photovoltaic array is one. FIG. 19A shows a P-V curve a and a maximum power point b obtained by the MPPT control when an ordinate represents direct-current power P and an abscissa represents a direct-current V. FIG. 19B shows an I-V curve c and an amount of solar radiation d when an ordinate represents an amount of solar radiation and a direct current I and an abscissa represents a direct-current voltage V. FIG. 19C shows currents e1, e2, and e3 for each of the photovoltaic modules according to, e.g., the embodiment shown in FIG. 5 when an ordinate represents a direct current I and an abscissa represents a direct-current voltage V.

Figure 20A:
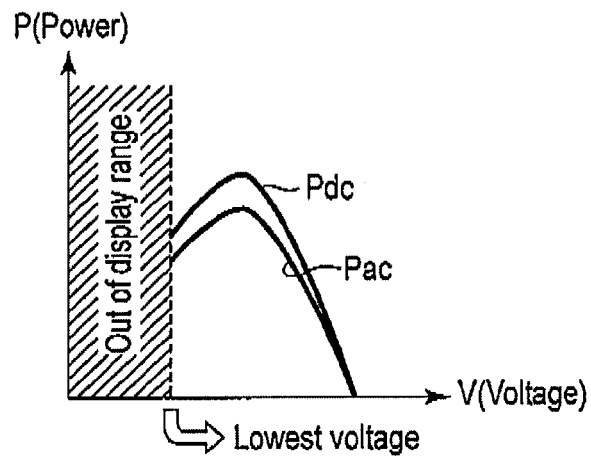
FIG. 20A is a view for explaining the display method of the display apparatus that displays an output from the curve trace apparatus in the photovoltaic power generation system according to the present invention.

FIG. 20A is a view showing direct-current power Pdc and alternating-current power Vac in, e.g., the embodiment shown in FIG. 5 when an ordinate represents direct-current power P and an abscissa represents a direct-current voltage V.

Figure 20B:
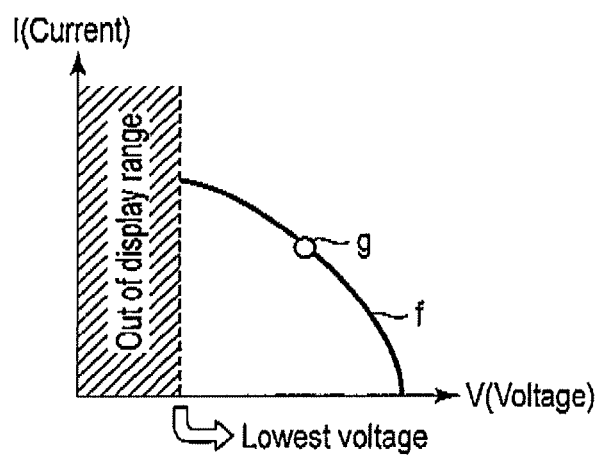
FIG. 20B is a view for explaining the display method of the display apparatus that displays an output from the curve trace apparatus in the photovoltaic power generation system according to the present invention.

FIG. 20B shows a P-V curve f and a maximum power point g when an ordinate represents a direct current I and an abscissa represents a direct-current voltage V.

Figure 21:
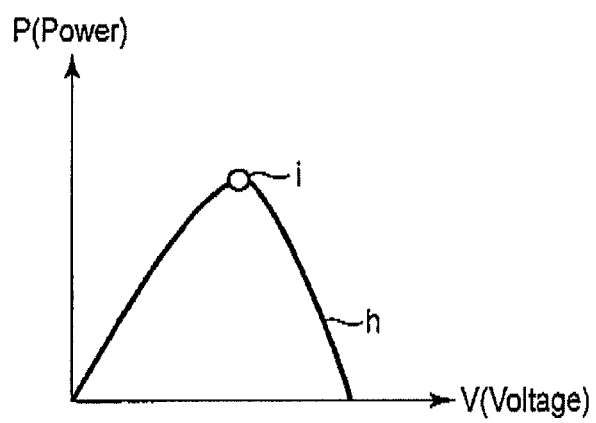
FIG. 21 is a view for explaining the display method of the display apparatus that displays an output from the curve trace apparatus in the photovoltaic power generation system according to the present invention.

FIG. 21 shows a display example showing a P-V curve h and a maximum power point i in a full direct-current voltage region obtained by the switches 811, 812, ... 81M in, e.g., the embodiment depicted in FIG. 8 when an ordinate represents direct-current power P and an abscissa represents a direct-current voltage V.

Figure 22A:
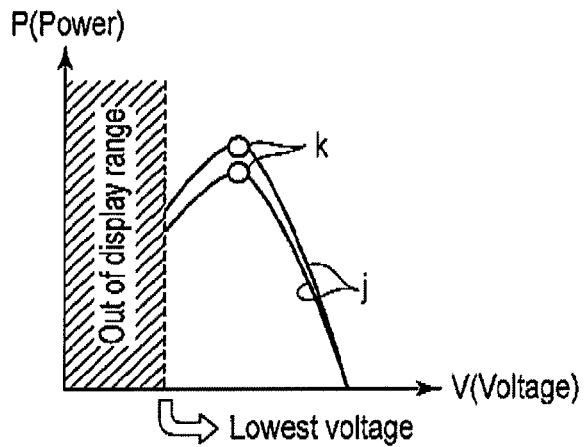
FIG. 22A is a view for explaining the display method of the display apparatus that displays an output from the curve trace apparatus in the photovoltaic power generation system according to the present invention.
Figure 22B:
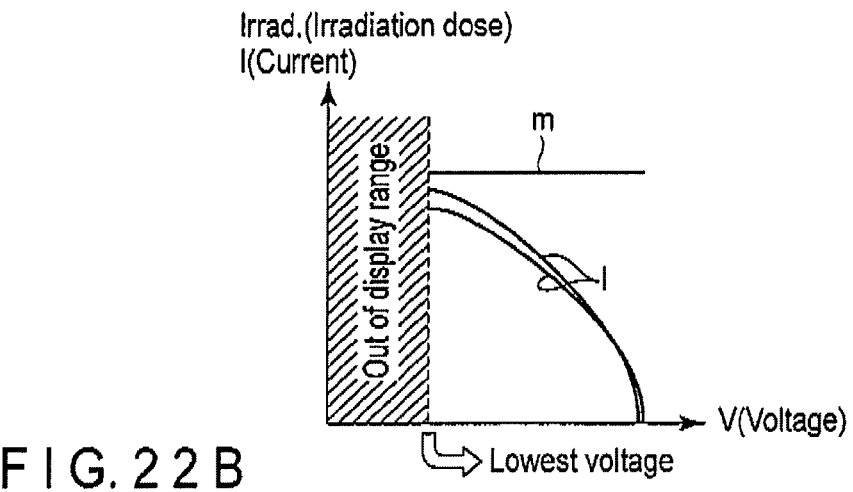
FIG. 22B is a view for explaining the display method of the display apparatus that displays an output from the curve trace apparatus in the photovoltaic power generation system according to the present invention.
Figure 22C:
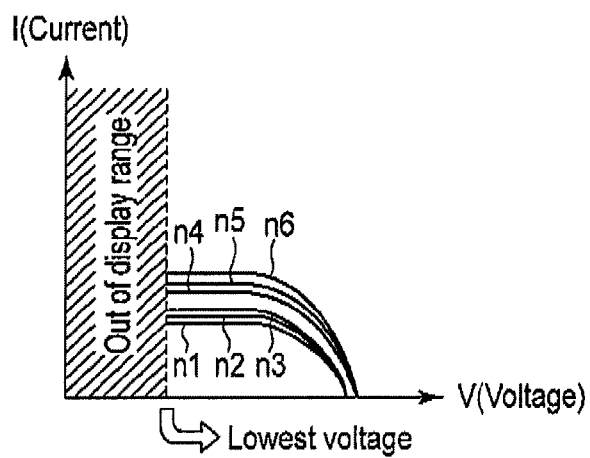
FIG. 22C is a view for explaining the display method of the display apparatus that displays an output from the curve trace apparatus in the photovoltaic power generation system according to the present invention.

Each of FIG. 22A to FIG. 24 shows a display example when the number of the photovoltaic arrays is more than one. FIG. 22A shows a P-V curve j and a maximum power point k obtained by the MPPT control when an ordinate represents direct-current power P and an abscissa represents a direct-current voltage V. FIG. 22B shows an I-V curve l and an amount of solar radiation m when an ordinate represents an amount of solar radiation and a direct current I and an abscissa represents a direct-current voltage V. FIG. 22C shows currents n1, n2, n3, n4, n5, and n6 for the respective photovoltaic modules in, e.g., the embodiment depicted in FIG. 5 when an ordinate represents a direct current I and an abscissa represents a direct-current voltage V.

Figure 23A:
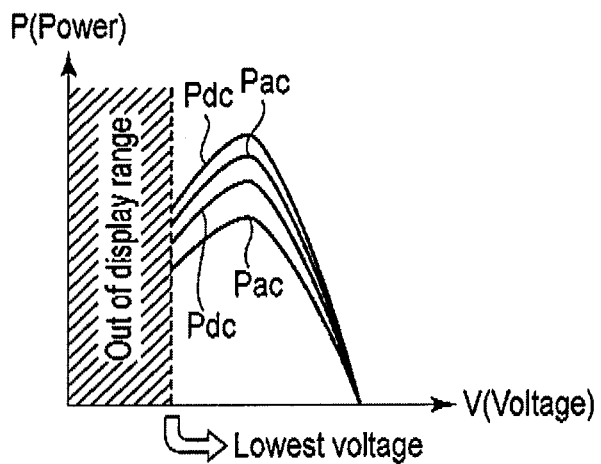
FIG. 23A is a view for explaining the display method of the display apparatus that displays an output from the curve trace apparatus in the photovoltaic power generation system according to the present invention.

FIG. 23A is a view showing direct-current power Pdc and an alternating current Vac in, e.g., the embodiment depicted in FIG. 5 when an ordinate represents direct-current power P and an abscissa represents a direct-current voltage V.

Figure 23B:
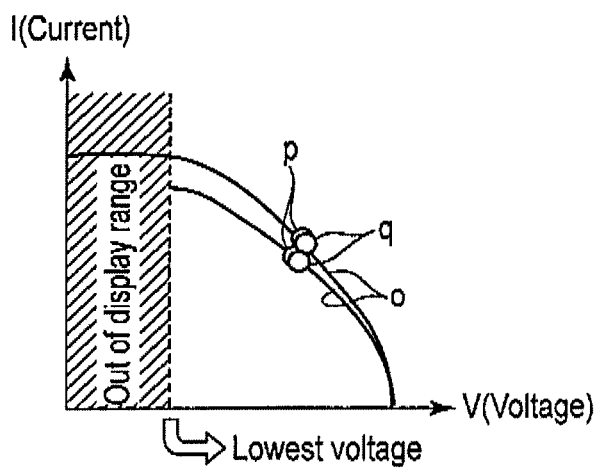
FIG. 23B is a view for explaining the display method of the display apparatus that displays an output from the curve trace apparatus in the photovoltaic power generation system according to the present invention.

FIG. 23B shows a P-V curve o and maximum power points p and q when an ordinate represents a direct current I and an abscissa represents a direct-current voltage V.

Figure 24:
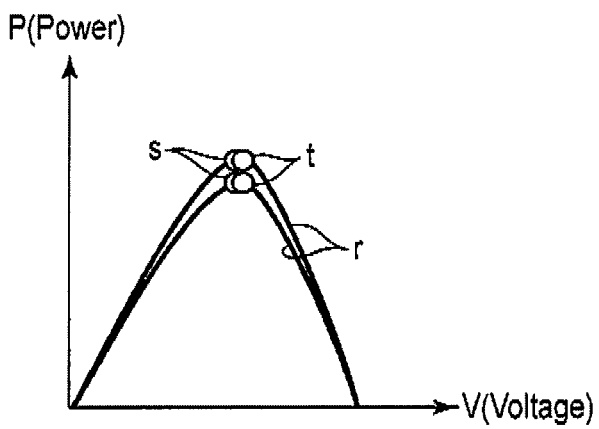
FIG. 24 is a view for explaining the display method of the display apparatus that displays an output from the curve trace apparatus in the photovoltaic power generation system according to the present invention.

FIG. 24 shows a display example of a P-V curve r and maximum power point s and t in a full direct-current voltage region obtained by the switches 811, 812, ... 81M in, e.g., the embodiment depicted in FIG. 8 when an ordinate represents direct-current power P and an abscissa represents a direct-current voltage V.

A modification of the present invention will now be described. All of the foregoing embodiments correspond to a situation where a plurality of photovoltaic arrays are provided, but a single photovoltaic array alone may be used as a configuration.

In this case, there is provided a photovoltaic power generation system comprising: a photovoltaic array including photovoltaic modules, the photovoltaic power generation system further comprising a control apparatus configured to display output characteristics of the photovoltaic array and power generating conditions of the photovoltaic array in synchronization.

Further, there is provided a photovoltaic power generation system comprising:

a photovoltaic array; a power conditioner which converts direct-current power generated by the photovoltaic array into desired direct-current power, further converts it into alternating-current power, and supplies it to an alternating-current power system, or converts direct-current power generated by the photovoltaic array into alternating-current power and supplies it to the alternating-current power system; a supervisory remote control apparatus which supervises and controls a state of the alternating-current power system; and a measurement apparatus which measures power generating conditions of the photovoltaic array, the photovoltaic power generation system further comprising:

a communication system which has communication apparatuses installed in the supervisory remote control apparatus, the power conditioner, and the measurement apparatus, respectively, and comprises a signal transmission path which enables communication between the communication apparatus in the supervisory remote control apparatus and the communication apparatus in the measurement apparatus and between the communication apparatus in the supervisory remote control apparatus and the communication apparatus in the power conditioner;

a control switching apparatus that switches MPPT control, by which the power conditioner receives a direct-current voltage command or a direct current command and a control switching command from the supervisory remote control apparatus through the communication system and an output from the power conversion apparatus included in the power conditioner becomes maximum, to voltage control or current control using the direct-current voltage command Vref or the direct current command Iref;

a power generating condition detector which is installed in the measurement apparatus and detects power generating conditions of the photovoltaic array;

a direct-current voltage detector which detects a direct-current voltage that is an output from the photovoltaic array;

a direct current detector which detects a direct current that is an output from the photovoltaic array; and a curve trace apparatus which is installed in the supervisory remote control apparatus, fetches a direct current detection value (I) detected by the direct current detector and a direct-current voltage detection value (V) detected by the direct-current voltage detector, traces an I-V characteristic diagram of the photovoltaic array, and also traces power generating conditions detected by the power generating condition detection on the I-V characteristic diagram, the I-V characteristic diagram and the power generating condition detection value being traced in synchronization with transmission of the direct-current voltage command or the direct current command and the control switching command from the supervisory remote control apparatus to the control switching apparatus, and the I-V characteristic diagram and the power generating condition detection value being displayed.

Furthermore, there is provided a photovoltaic power generation system comprising:

a photovoltaic array; a power conditioner which converts direct-current power generated by the photovoltaic array into desired direct-current power, further converts it into alternating-current power, and supplies it to an alternating-current power system, or converts direct-current power generated by the photovoltaic array into alternating-current power and supplies it to the alternating-current power system; a supervisory remote control apparatus which supervises and controls a state of the alternating-current power system; and a measurement apparatus which measures power generating conditions of the photovoltaic array, the photovoltaic power generation system further comprising:

a communication system which has communication apparatuses installed in the supervisory remote control apparatus, the power conditioner, and the measurement apparatus, respectively, and comprises a signal transmission path which enables communication between the communication apparatus in the supervisory remote control apparatus and the communication apparatus in the measurement apparatus and between the communication apparatus in the supervisory remote control apparatus and the communication apparatus in the power conditioner;

a control switching apparatus that switches MPPT control, by which the power conditioner receives a direct-current voltage command or a direct current command and a control switching command from the supervisory remote control apparatus through the communication system and an output from the power conversion apparatus included in the power conditioner becomes maximum, to voltage control or current control using the direct-current voltage command Vref or the direct current command Iref;

a power generating condition detector which is installed in the measurement apparatus and detects power generating conditions of the photovoltaic array;

a direct-current voltage detector which detects a direct-current voltage that is an output from the photovoltaic array;

a direct current detector which detects a direct current that is an output from the photovoltaic array; and a curve trace apparatus which is installed in the supervisory remote control apparatus, fetches a direct current detection value (I) detected by the direct current detector and a direct-current voltage detection value (V) detected by the direct-current voltage detector in synchronization with transmission of the direct-current voltage command or the direct current command from the supervisory remote control apparatus, traces a P-V characteristic diagram from direct-current power (P) calculated based on the direct-current voltage detection value (V) and the direct current detection value (I) and the direct-current voltage detection value (V), and also traces power generating conditions detected by the power generating condition detector on the P-V characteristic diagram, the P-V characteristic diagram, the solar radiation intensity detection value, and the air temperature detection value being traced in synchronization with transmission of the direct-current voltage command or the direct current command and the control switching command from the supervisory remote control apparatus to the control switching apparatus.

Moreover, there is provided a photovoltaic power generation system comprising:

a photovoltaic array; a power conditioner which converts direct-current power generated by the photovoltaic array into desired direct-current power, further converts it into alternating-current power, and supplies it to an alternating-current power system, or converts direct-current power generated by the photovoltaic array into alternating-current power and supplies it to the alternating-current power system; a supervisory remote control apparatus which supervises and controls a state of the alternating-current power system; and a measurement apparatus which measures power generating conditions of the photovoltaic array, the photovoltaic power generation system further comprising:

a communication system which has communication apparatuses installed in the supervisory remote control apparatus, the power conditioner, and the measurement apparatus, respectively, and comprises a signal transmission path which enables communication between the communication apparatus in the supervisory remote control apparatus and the communication apparatus in the measurement apparatus and between the communication apparatus in the supervisory remote control apparatus and the communication apparatus in the power conditioner;

a control switching apparatus that switches MPPT control, by which the power conditioner receives a direct-current voltage command or a direct current command and a control switching command from the supervisory remote control apparatus through the communication system and an output from the power conversion apparatus included in the power conditioner becomes maximum, to voltage control or current control using the direct-current voltage command Vref or the direct current command Iref;

a power generating condition detector which is installed in the measurement apparatus and detects power generating conditions of the photovoltaic array;

a direct-current voltage detector which detects a direct-current voltage that is an output from the photovoltaic array;

a direct current detector which detects a direct current that is an output from the photovoltaic array; and a curve trace apparatus which is installed in the supervisory remote control apparatus, fetches a direct current detection value (I) detected by the direct current detector and a direct-current voltage detection value (V) detected by the direct-current voltage detector in synchronization with transmission of the direct-current voltage command or the direct current command from the supervisory remote control apparatus, traces an I-V characteristic diagram, traces a P-V characteristic diagram from direct-current power (P) calculated based on the direct-current voltage detection value (V) and the direct current detection value (I) and the direct-current voltage detection value (V), and also traces power generating conditions detected by the power generating condition detector on the P-V characteristic diagram, the I-V characteristic diagram of the photovoltaic array, the P-V characteristic diagram of the photovoltaic array, and the power generating condition detection value being traced in synchronization with transmission of the direct-current voltage command or the direct current command and the control switching command from the supervisory remote control apparatus to the control switching apparatus.

Additionally, there is provided a photovoltaic power generation system comprising:

a photovoltaic array; a power conditioner which converts direct-current power generated by the photovoltaic array into desired direct-current power, further converts it into alternating-current power, and supplies it to an alternating-current power system, or converts direct-current power generated by the photovoltaic array into alternating-current power and supplies it to the alternating-current power system; a supervisory remote control apparatus which supervises and controls a state of the alternating-current power system; and a measurement apparatus which measures power generating conditions of the photovoltaic array, the photovoltaic power generation system further comprising:

a communication system which has communication apparatuses installed in the supervisory remote control apparatus, the power conditioner, and the measurement apparatus, respectively, and comprises a signal transmission path which enables communication between the communication apparatus in the supervisory remote control apparatus and the communication apparatus in the measurement apparatus and between the communication apparatus in the supervisory remote control apparatus and the communication apparatus in the power conditioner;

a control switching apparatus that switches MPPT control, by which the power conditioner receives a direct-current voltage command or a direct current command and a control switching command from the supervisory remote control apparatus through the communication system and an output from the power conversion apparatus included in the power conditioner becomes maximum, to voltage control or current control using the direct-current voltage command Vref or the direct current command Iref;

a power generating condition detector which is installed in the measurement apparatus and detects power generating conditions of the photovoltaic array;

a direct-current voltage detector which detects a direct-current voltage that is an output from the photovoltaic array;

a direct current detector which detects a direct current that is an output from the photovoltaic array;

an alternating-current power detector which detects alternating-current power that is an output from the power conversion apparatus; and a curve trace apparatus which is installed in the supervisory remote control apparatus, fetches a direct current detection value (I) detected by the direct current detector and a direct-current voltage detection value (V) detected by the direct-current voltage detector in synchronization with transmission of the direct-current voltage command or the direct current command from the supervisory remote control apparatus, traces an I-V characteristic diagram, traces a P-V characteristic diagram from direct-current power (P) calculated based on the direct-current voltage detection value (V) and the direct current detection value (I) and the direct-current voltage detection value (V), and also traces power generating conditions detected by the power generating condition detector and an alternating-current power detection value detected by the alternating-current power detector on the P-V characteristic diagram, the I-V characteristic diagram of the photovoltaic array, the P-V characteristic diagram of the photovoltaic array, and the power generating condition detection value being traced in synchronization with transmission of the direct-current voltage command or the direct current command and the control switching command from the supervisory remote control apparatus to the control switching apparatus.

Further, there is provided a photovoltaic power generation system comprising:

a photovoltaic array; a power conditioner which converts direct-current power generated by the photovoltaic array into desired direct-current power, further converts it into alternating-current power, and supplies it to an alternating-current power system, or converts direct-current power generated by the photovoltaic array into alternating-current power and supplies it to the alternating-current power system; a supervisory remote control apparatus which supervises and controls a state of the alternating-current power system; and a measurement apparatus which measures power generating conditions of the photovoltaic array, the photovoltaic power generation system further comprising:

a communication system which has communication apparatuses installed in the supervisory remote control apparatus, the power conditioner, and the measurement apparatus, respectively, and comprises a signal transmission path which enables communication between the communication apparatus in the supervisory remote control apparatus and the communication apparatus in the measurement apparatus and between the communication apparatus in the supervisory remote control apparatus and the communication apparatus in the power conditioner;

a control switching apparatus that switches MPPT control, by which the power conditioner receives a direct-current voltage command or a direct current command and a control switching command from the supervisory remote control apparatus through the communication system and an output from the power conversion apparatus included in the power conditioner becomes maximum, to voltage control or current control using the direct-current voltage command Vref or the direct current command Iref;

a power generating condition detector which is installed in the measurement apparatus and detects power generating conditions of the photovoltaic array;

a direct-current voltage detector which detects a direct-current voltage that is an output from the photovoltaic array;

a direct current detector which detects a direct current that is an output from the photovoltaic array; and a curve trace apparatus which is installed in the supervisory remote control apparatus, fetches a direct current detection value (I) detected by the direct current detector and a direct-current voltage detection value (V) detected by the direct-current voltage detector in synchronization with transmission of the direct-current voltage command or the direct current command from the supervisory remote control apparatus, traces an I-V characteristic diagram, traces a P-V characteristic diagram from direct-current power (P) calculated based on the direct-current voltage detection value (V) and the direct current detection value (I) and the direct-current voltage detection value (V), and also traces power generating conditions detected by the power generating condition detector and an alternating-current power detection value detected by an alternating-current power detector on the P-V characteristic diagram, the I-V characteristic diagram of the photovoltaic array, the P-V characteristic diagram of the photovoltaic array, and the power generating condition detection value being traced in synchronization with transmission of the direct-current voltage command or the direct current command and the control switching command from the supervisory remote control apparatus to the control switching apparatus.

Furthermore, there is provided a photovoltaic power generation system, wherein the photovoltaic array is divided into photovoltaic modules, and a direct current smoothing capacitor is provided on an input side of a power conversion apparatus included in the power conditioner, and wherein a switch is provided to a cable run connected with each photovoltaic module to enable selection of one of the photovoltaic modules, and a cable run switch which enables performing initial charging of the smoothing capacitor simultaneously with a trace operation of the curve trace apparatus is provided on an input side of the direct current smoothing capacitor.

Moreover, there is provided a photovoltaic power generation system comprising:

a plurality of photovoltaic arrays, and curve trace apparatuses each of which traces output characteristics of at least a direct current I and a direct-current voltage V as outputs from each of the photovoltaic arrays in accordance with each of the photovoltaic arrays, the photovoltaic power generation system further comprising a control apparatus configured to perform display control of each curve trace apparatus in synchronization.

Additionally, in the above explanation, the communication system comprising the communication apparatus and the signal transmission path includes one of a wire communication system, a wireless communication system, and a communication system having a combination of wire communication and wireless communication.

It is needless to say that the present invention can be applied to not only the large-scale, e.g., a megawatt-class photovoltaic power generation system or the clustered grid-connected photovoltaic power generation system but also a verification experiment system that evaluates the photovoltaic power generation system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A photovoltaic power generation system comprising:
a photovoltaic array including photovoltaic modules;
a control apparatus configured to display output characteristics of the photovoltaic array and power generating conditions of the photovoltaic array in synchronization; and
a curve trace apparatus that traces a P-V characteristic diagram from direct-current power (P) calculated based on a direct-current voltage detection value (V) and a direct current detection value (I), and also traces power generating conditions and an alternating-current power detection value on the P-V characteristic diagram.

2. A photovoltaic power generation system comprising:
a photovoltaic array;
a power conditioner which converts direct-current power generated by the photovoltaic array into desired direct-current power, further converts it into alternating-current power, and supplies it to an alternating-current power system, or converts direct-current power generated by the photovoltaic array into alternating-current power and supplies it to the alternating-current power system;
a supervisory remote control apparatus which supervises and controls a state of the alternating-current power system;
a measurement apparatus which measures power generating conditions of the photovoltaic array;
a communication system which has communication apparatuses installed in the supervisory remote control apparatus, the power conditioner, and the measurement apparatus, respectively, and comprises
a signal transmission path which enables communication between the communication apparatus in the supervisory remote control apparatus and the communication apparatus in the measurement apparatus and between the communication apparatus in the supervisory remote control apparatus and the communication apparatus in the power conditioner;
a control switching apparatus that switches MPPT control, by which the power conditioner receives a direct-current voltage command or a direct current command and a control switching command from the supervisory remote control apparatus through the communication system and an output from the power conversion apparatus included in the power conditioner becomes maximum, to voltage control or current control using the direct-current voltage command Vref or the direct current command Iref;

a power generating condition detector which is installed in the measurement apparatus and detects power generating conditions of the photovoltaic array;

a direct-current voltage detector which detects a direct-current voltage that is an output from the photovoltaic array;

a direct current detector which detects a direct current that is an output from the photovoltaic array; and a curve trace apparatus which is installed in the supervisory remote control apparatus, fetches a direct current detection value (I) detected by the direct current detector and a direct-current voltage detection value (V) detected by the direct-current voltage detector, traces an I-V characteristic diagram of the photovoltaic array, traces a P-V characteristic diagram from direct-current power (P) calculated based on the direct-current voltage detection value (V) and the direct current detection value (I), and also traces power generating conditions detected by the power generating condition detector on the I-V characteristic diagram and an alternating-current power detection value detected by the alternating-current power detector on the P-V characteristic diagram, the I-V characteristic diagram and the power generating condition detection value being traced in synchronization with transmission of the direct-current voltage command or the direct current command and the control switching command from the supervisory remote control apparatus to the control switching apparatus, and the I-V characteristic diagram and the power generating condition detection value being displayed.

3. A photovoltaic power generation system comprising:

a photovoltaic array;

a power conditioner which converts direct-current power generated by the photovoltaic array into desired direct-current power, further converts it into alternating-current power, and supplies it to an alternating-current power system, or converts direct-current power generated by the photovoltaic array into alternating-current power and supplies it to the alternating-current power system;

a supervisory remote control apparatus which supervises and controls a state of the alternating-current power system;

a measurement apparatus which measures power generating conditions of the photovoltaic array;

a communication system which has communication apparatuses installed in the supervisory remote control apparatus, the power conditioner, and the measurement apparatus, respectively, and comprises a signal transmission path which enables communication between the communication apparatus in the supervisory remote control apparatus and the communication apparatus in the measurement apparatus and between the communication apparatus in the supervisory remote control apparatus and the communication apparatus in the power conditioner;

a control switching apparatus that switches MPPT control, by which the power conditioner receives a direct-current voltage command or a direct current command and a control switching command from the supervisory remote control apparatus through the communication system and an output from the power conversion apparatus included in the power conditioner becomes maximum, to voltage control or current control using the direct-current voltage command Vref or the direct current command Iref;

a power generating condition detector which is installed in the measurement apparatus and detects power generating conditions of the photovoltaic array;

a direct-current voltage detector which detects a direct-current voltage that is an output from the photovoltaic array;

a direct current detector which detects a direct current that is an output from the photovoltaic array; and a curve trace apparatus which is installed in the supervisory remote control apparatus, fetches a direct current detection value (I) detected by the direct current detector and a direct-current voltage detection value (V) detected by the direct-current voltage detector in synchronization with transmission of the direct-current voltage command or the direct current command from the supervisory remote control apparatus, traces a P-V characteristic diagram from direct-current power (P) calculated based on the direct-current voltage detection value (V) and the direct current detection value (I), and also traces power generating conditions detected by the power generating condition detector and an alternating-current power detection value detected by an alternating-current power detector on the P-V characteristic diagram, the P-V characteristic diagram, the solar radiation intensity detection value, and the air temperature detection value being traced in synchronization with transmission of the direct-current voltage command or the direct current command and the control switching command from the supervisory remote control apparatus to the control switching apparatus.

4. A photovoltaic power generation system comprising:

a photovoltaic array;

a power conditioner which converts direct-current power generated by the photovoltaic array into desired direct-current power, further converts it into alternating-current power, and supplies it to an alternating-current power system, or converts direct-current power generated by the photovoltaic array into alternating-current power and supplies it to the alternating-current power system;

a supervisory remote control apparatus which supervises and controls a state of the alternating-current power system; and a measurement apparatus which measures power generating conditions of the photovoltaic array;

a communication system which has communication apparatuses installed in the supervisory remote control apparatus, the power conditioner, and the measurement apparatus, respectively, and comprises a signal transmission path which enables communication between the communication apparatus in the supervisory remote control apparatus and the communication apparatus in the measurement apparatus and between the communication apparatus in the supervisory remote control apparatus and the communication apparatus in the power conditioner;

a control switching apparatus that switches MPPT control, by which the power conditioner receives a direct-current voltage command or a direct current command and a control switching command from the supervisory remote control apparatus through the communication system and an output from the power conversion apparatus included in the power conditioner becomes maximum, to voltage control or current control using the direct-current voltage command Vref or the direct current command Iref;

a power generating condition detector which is installed in the measurement apparatus and detects power generating conditions of the photovoltaic array;

a direct-current voltage detector which detects a direct-current voltage that is an output from the photovoltaic array;

a direct current detector which detects a direct current that is an output from the photovoltaic array; and a curve trace apparatus which is installed in the supervisory remote control apparatus, fetches a direct current detection value (I) detected by the direct current detector and a direct-current voltage detection value (V) detected by the direct-current voltage detector in synchronization with transmission of the direct-current voltage command or the direct current command from the supervisory remote control apparatus, traces an I-V characteristic diagram, traces a P-V characteristic diagram from direct-current power (P) calculated based on the direct-current voltage detection value (V) and the direct current detection value (I), and also traces power generating conditions detected by the power generating condition detector and an alternating-current power detection value detected by an alternating-current power detector on the P-V characteristic diagram, the I-V characteristic diagram of the photovoltaic array, the P-V characteristic diagram of the photovoltaic array, and the power generating condition detection value being traced in synchronization with transmission of the direct-current voltage command or the direct current command and the control switching command from the supervisory remote control apparatus to the control switching apparatus.

5. A photovoltaic power generation system comprising:

a photovoltaic array;

a power conditioner which converts direct-current power generated by the photovoltaic array into desired direct-current power, further converts it into alternating-current power, and supplies it to an alternating-current power system, or converts direct-current power generated by the photovoltaic array into alternating-current power and supplies it to the alternating-current power system;

a supervisory remote control apparatus which supervises and controls a state of the alternating-current power system; and a measurement apparatus which measures power generating conditions of the photovoltaic array;

a communication system which has communication apparatuses installed in the supervisory remote control apparatus, the power conditioner, and the measurement apparatus, respectively, and comprises a signal transmission path which enables communication between the communication apparatus in the supervisory remote control apparatus and the communication apparatus in the measurement apparatus and between the communication apparatus in the supervisory remote control apparatus and the communication apparatus in the power conditioner;

a control switching apparatus that switches MPPT control, by which the power conditioner receives a direct-current voltage command or a direct current command and a control switching command from the supervisory remote control apparatus through the communication system and an output from the power conversion apparatus included in the power conditioner becomes maximum, to voltage control or current control using the direct-current voltage command Vref or the direct current command Iref;

a power generating condition detector which is installed in the measurement apparatus and detects power generating conditions of the photovoltaic array;

a direct-current voltage detector which detects a direct-current voltage that is an output from the photovoltaic array;

a direct current detector which detects a direct current that is an output from the photovoltaic array;

an alternating-current power detector which detects alternating-current power that is an output from the power conversion apparatus; and a curve trace apparatus which is installed in the supervisory remote control apparatus, fetches a direct current detection value (I) detected by the direct current detector and a direct-current voltage detection value (V) detected by the direct-current voltage detector in synchronization with transmission of the direct-current voltage command or the direct current command from the supervisory remote control apparatus, traces an I-V characteristic diagram, traces a P-V characteristic diagram from direct-current power (P) calculated based on the direct-current voltage detection value (V) and the direct current detection value (I), and also traces power generating conditions detected by the power generating condition detector and an alternating-current power detection value detected by the alternating-current power detector on the P-V characteristic diagram, the I-V characteristic diagram of the photovoltaic array, the P-V characteristic diagram of the photovoltaic array, and the power generating condition detection value being traced in synchronization with transmission of the direct-current voltage command or the direct current command and the control switching command from the supervisory remote control apparatus to the control switching apparatus.

6. A photovoltaic power generation system comprising:

a photovoltaic array;

a power conditioner which converts direct-current power generated by the photovoltaic array into desired direct-current power, further converts it into alternating-current power, and supplies it to an alternating-current power system, or converts direct-current power generated by the photovoltaic array into alternating-current power and supplies it to the alternating-current power system;

a supervisory remote control apparatus which supervises and controls a state of the alternating-current power system; and a measurement apparatus which measures power generating conditions of the photovoltaic array;

a communication system which has communication apparatuses installed in the supervisory remote control apparatus, the power conditioner, and the measurement apparatus, respectively, and comprises a signal transmission path which enables communication between the communication apparatus in the supervisory remote control apparatus and the communication apparatus in the measurement apparatus and between the communication apparatus in the supervisory remote control apparatus and the communication apparatus in the power conditioner;

a control switching apparatus that switches MPPT control, by which the power conditioner receives a direct-current voltage command or a direct current command and a control switching command from the supervisory remote control apparatus through the communication system and an output from the power conversion apparatus included in the power conditioner becomes maximum, to voltage control or current control using the direct-current voltage command Vref or the direct current command Iref;

a power generating condition detector which is installed in the measurement apparatus and detects power generating conditions of the photovoltaic array;

a direct-current voltage detector which detects a direct-current voltage that is an output from the photovoltaic array;

a direct current detector which detects a direct current that is an output from the photovoltaic array; and a curve trace apparatus which is installed in the supervisory remote control apparatus, fetches a direct current detection value (I) detected by the direct current detector and a direct-current voltage detection value (V) detected by the direct-current voltage detector in synchronization with transmission of the direct-current voltage command or the direct current command from the supervisory remote control apparatus, traces an I-V characteristic diagram, traces a P-V characteristic diagram from direct-current power (P) calculated based on the direct-current voltage detection value (V) and the direct current detection value (I), and also traces power generating conditions detected by the power generating condition detector and an alternating-current power detection value detected by an alternating-current power detector on the P-V characteristic diagram, the I-V characteristic diagram of the photovoltaic array, the P-V characteristic diagram of the photovoltaic array, and the power generating condition detection value being traced in synchronization with transmission of the direct-current voltage command or the direct current command and the control switching command from the supervisory remote control apparatus to the control switching apparatus.

7. The photovoltaic power generation system according to one of claims 2 to 5, wherein the photovoltaic array is divided into photovoltaic modules, and a direct current smoothing capacitor is provided on an input side of a power conversion apparatus included in the power conditioner, and wherein a switch is provided to a cable run connected with each photovoltaic module to enable selection of one of the photovoltaic modules, and a cable run switch which enables performing initial charging of the smoothing capacitor simultaneously with a trace operation of the curve trace apparatus is provided on an input side of the direct current smoothing capacitor.

8. A photovoltaic power generation system comprising:
a plurality of photovoltaic arrays;
curve trace apparatuses each of which traces output characteristics of at least a direct current I and a direct-current voltage V as outputs from each of the photovoltaic arrays in accordance with each of the photovoltaic arrays; and
a control apparatus configured to perform display control of each curve trace apparatus in synchronization,
wherein one of the curve trace apparatuses traces a P-V characteristic diagram from direct-current power (P) calculated based on a detected value of direct-current voltage V and a detected value of the direct current I, and also traces power generating conditions detected by a power generating condition detector and an alternating-current power detection value detected by an alternating-current power detector on the P-V characteristic diagram.

9. A photovoltaic power generation system comprising:
a plurality of photovoltaic arrays;
a power conditioner which converts direct-current power generated by each of the photovoltaic arrays into desired direct-current power, further converts it into alternating-current power, and supplies it to an alternating-current power system, or converts direct-current power generated by each of the photovoltaic arrays into alternating-current power and supplies it to the alternating-current power system;
a supervisory remote control apparatus which supervises and controls a state of the alternating-current power system;
a measurement apparatus which measures power generating conditions of each of the photovoltaic arrays;
a communication system which has communication apparatuses installed in the supervisory remote control apparatus, the power conditioner in each of the photovoltaic arrays, and the measurement apparatus, respectively, and comprises a signal transmission path which enables communication between the communication apparatus in the supervisory remote control apparatus and the communication apparatus in the measurement apparatus and between the communication apparatus in the supervisory remote control apparatus and the communication apparatus in each power conditioner;
a control switching apparatus that switches MPPT control, by which each power conditioner receives a direct-current voltage command or a direct current command and a control switching command from the supervisory remote control apparatus through the communication system and an output from the power conversion apparatus included in each power conditioner becomes maximum, to voltage control or current control using the direct-current voltage command Vref or the direct current command Iref;
at least one power generating condition detector which detects power generating conditions of the photovoltaic arrays;
a direct-current voltage detector which detects a direct-current voltage that is an output from each photovoltaic array;
a direct current detector which detects a direct current that is an output from each photovoltaic array; and
a curve trace apparatus which is installed in the supervisory remote control apparatus, fetches a direct current detection value (I) detected by each direct current detector and a direct-current voltage detection value (V) detected by the direct-current voltage detector, traces an I-V characteristic diagram of each photovoltaic array, traces a P-V characteristic diagram of each photovoltaic array from direct-current power (P) calculated based on the direct-current voltage detection value (V) and the direct current detection value (I), and also traces power generating conditions detected by the power generating condition detector and an alternating-current power detection value detected by an alternating-current power detector on the P-V characteristic diagram of each photovoltaic array and the I-V characteristic diagram of each photovoltaic array, the I-V characteristic diagram of each photovoltaic array and the power generating condition detection value being traced in synchronization with transmission of the direct-current voltage command or the direct current command and the control switching command from the supervisory remote control apparatus to the control switching apparatus, and the I-V characteristic diagram of each photovoltaic array and the power generating condition detection value being displayed.

10. A photovoltaic power generation system comprising:
a plurality of photovoltaic arrays;
a power conditioner which converts direct-current power generated by each of the photovoltaic arrays into desired direct-current power, further converts it into alternating-current power, and supplies it to an alternating-current power system, or converts direct-current power generated by each of the photovoltaic arrays into alternating-current power and supplies it to the alternating-current power system;
a supervisory remote control apparatus which supervises and controls a state of the alternating-current power system; and
a measurement apparatus which measures power generating conditions of each of the photovoltaic arrays;
a communication system which has communication apparatuses installed in the supervisory remote control apparatus, the power conditioner in each of the photovoltaic arrays, and the measurement apparatus, respectively, and comprises a signal transmission path which enables communication between the communication apparatus in the supervisory remote control apparatus and the communication apparatus in the measurement apparatus and between the communication apparatus in the supervisory remote control apparatus and the communication apparatus in each power conditioner;
a control switching apparatus that switches MPPT control, by which each power conditioner receives a direct-current voltage command or a direct current command and a control switching command from the supervisory remote control apparatus through the communication system and an output from the power conversion apparatus included in each power conditioner becomes maximum, to voltage control or current control using the direct-current voltage command Vref or the direct current command Iref;
at least one power generating condition detector which detects power generating conditions of the photovoltaic arrays;
a direct-current voltage detector which detects a direct-current voltage that is an output from each photovoltaic array;
a direct current detector which detects a direct current that is an output from each photovoltaic array; and
a curve trace apparatus which is installed in the supervisory remote control apparatus, fetches a direct current detection value (I) detected by each direct current detector and a direct-current voltage detection value (V) detected by each direct-current voltage detector, traces a P-V characteristic diagram of each photovoltaic array from direct-current power (P) calculated based on the direct current detection value (I) of each photovoltaic array and the direct-current voltage detection value (V) power generating conditions detected, including an air temperature detection value, by the power generating condition detector and an alternating-current power detection value detected by the alternating-current power detector on the P-V characteristic diagram of each photovoltaic array, the P-V characteristic diagram of each photovoltaic array and the power generating condition detection value being traced in synchronization with transmission of the direct-current voltage command or the direct current command and the control switching command from the supervisory remote control apparatus to the control switching apparatus, and the P-V characteristic diagram of each photovoltaic array and the power generating condition detection value being displayed.

11. A photovoltaic power generation system comprising:
a plurality of photovoltaic arrays;
a power conditioner which converts direct-current power generated by each of the photovoltaic arrays into desired direct-current power, further converts it into alternating-current power, and supplies it to an alternating-current power system, or converts direct-current power generated by each of the photovoltaic arrays into alternating-current power and supplies it to the alternating-current power system;
a supervisory remote control apparatus which supervises and controls a state of the alternating-current power system;
a measurement apparatus which measures power generating conditions of each of the photovoltaic arrays;
a communication system which has communication apparatuses installed in the supervisory remote control apparatus, the power conditioner in each of the photovoltaic arrays, and the measurement apparatus, respectively, and comprises a signal transmission path which enables communication between the communication apparatus in the supervisory remote control apparatus and the communication apparatus in the measurement apparatus and between the communication apparatus in the supervisory remote control apparatus and the communication apparatus in each power conditioner;
a control switching apparatus which controls in such a manner that the power conditioner receives a direct-current voltage command or a direct current command and a control switching command from the supervisory remote control apparatus through the communication system and an output from a power conversion apparatus included in the power conditioner becomes maximum;
at least one power generating condition detector which detects power generation conditions of the photovoltaic array;
a direct-current voltage detector which detects a direct-current voltage that is an output from each photovoltaic array;
a direct current detector which detects a direct current that is an output from each photovoltaic array; and
a curve trace apparatus which is installed in the supervisory remote control apparatus, fetches a direct current detection value (I) of each photovoltaic array detected by each direct current detector and a direct-current voltage detection value (V) detected by each direct-current voltage detector of each photovoltaic array, traces an I-V characteristic diagram of each photovoltaic array, traces a P-V characteristic diagram of each photovoltaic array from direct-current power (P) calculated based on the direct current (I) and the direct voltage (V) of each photovoltaic array power generating conditions detected by the power generating condition detector and an alternating-current power detection value detected by an alternating-current power detector on the I-V characteristic diagram of each photovoltaic array and the P-V characteristic diagram of each photovoltaic array, the I-V characteristic diagram of each photovoltaic array, the P-V characteristic diagram of each photovoltaic array, and the power generating condition detection value being traced in synchronization with transmission of the direct-current voltage command or the direct current command and the control switching command to the control switching apparatus from the supervisory remote control apparatus, and the I-V characteristic diagram of each photovoltaic array, the P-V characteristic diagram of each photovoltaic array, and the power generating condition detection value being displayed.

12. A photovoltaic power generation system comprising:
a plurality of photovoltaic arrays;
a power conditioner which converts direct-current power generated by each of the photovoltaic arrays into desired direct-current power, further converts it into alternating-current power, and supplies it to an alternating-current power system, or converts direct-current power generated by each of the photovoltaic arrays into alternating-current power and supplies it to the alternating-current power system;
a supervisory remote control apparatus which supervises and controls a state of the alternating-current power system; and
a measurement apparatus which measures power generating conditions of each of the photovoltaic arrays;
a communication system which has communication apparatuses installed in the supervisory remote control apparatus, the power conditioner in each of the photovoltaic arrays, and the measurement apparatus, respectively, and comprises a signal transmission path which enables communication between the communication apparatus in the supervisory remote control apparatus and the communication apparatus in the measurement apparatus and between the communication apparatus in the supervisory remote control apparatus and the communication apparatus in each power conditioner;
a control switching apparatus that switches MPPT control, by which each power conditioner receives a direct-current voltage command or a direct current command and a control switching command from the supervisory remote control apparatus through the communication system and an output from the power conversion apparatus included in each power conditioner becomes maximum, to voltage control, or current control using the direct-current voltage command Vref or the direct current command Iref;
at least one solar radiation intensity detector which detects power generating conditions of the photovoltaic array;
a direct-current voltage detector which detects a direct-current voltage that is an output of each photovoltaic array;
a direct current detector which detects a direct current that is an output of each photovoltaic array;
an alternating-current power detector for an output of the power conversion apparatus; and
a curve trace apparatus which is installed in the supervisory remote control apparatus, fetches a direct current detection value (I) of each photovoltaic array detected by each direct current detector and a direct-current voltage detection value (V) detected by each direct-current voltage detector of each photovoltaic array, traces an I-V characteristic diagram of each photovoltaic array, traces a P-V characteristic diagram of each photovoltaic array from direct-current power (P) calculated based on the direct current (I) and the direct-current voltage (V) of each photovoltaic array, and also traces power generating conditions detected by the power generating condition detector and an alternating-current power detection value detected by the alternating-current power detector on the I-V characteristic diagram of each photovoltaic array and the P-V characteristic diagram of each photovoltaic array, the I-V characteristic diagram of each photovoltaic array, the P-V characteristic diagram of each photovoltaic array, and the power generating condition detection value being traced in synchronization with transmission of the direct-current voltage command or the direct current command and the control switching command to the control switching apparatus from the supervisory remote control apparatus, and the I-V characteristic diagram of each photovoltaic array, the P-V characteristic diagram of each photovoltaic array, and the power generating condition detection value being displayed.

13. The photovoltaic power generation system according to one of claims 9 to 12, further comprising a direct current smoothing capacitor on an input side of a power conversion apparatus included in the power conditioner, wherein a cable run switch which enables performing initial charging of the smoothing capacitor simultaneously with a trace operation of the curve trace apparatus is provided on the input side of the direct-current smoothing capacitor.

14. The photovoltaic power generation system according to one of claims 9 to 12, wherein the photovoltaic array is divided into photovoltaic modules or the photovoltaic arrays are provided, and a direct current smoothing capacitor is provided on an input side of a power conversion apparatus included in the power conditioner, and wherein a switch is provided to a cable run connected with each photovoltaic module or each photovoltaic array to enable selecting one of each photovoltaic module and each photovoltaic array, and a cable run switch that enables performing initial charging of the smoothing capacitor simultaneously with a trace operation of the curve trace apparatus is provided on the input side of the direct current smoothing capacitor.

15. The photovoltaic power generation system according to one of claims 2, 3, 4, 5, 9, 10, 11, and 12, wherein the power generating condition detector is one of a solar radiation intensimeter which measures solar radiation intensity, an anemometer which measures a velocity of wind, and an air temperature gauge which measures an air temperature at an installation position of the photovoltaic array or the photovoltaic module, or a temperature gauge which measures a temperature of the photovoltaic array or the photovoltaic module, or a camera configured to visually confirm a solar radiation environment at the installation position of the photovoltaic array or the photovoltaic module.

16. The photovoltaic power generation system according to one of claims 2, 3, 4, 5, 9, 10, 11, and 12, wherein a display apparatus that enables visually confirming the characteristic diagram traced by the curve trace apparatus is installed in accordance with the supervisory remote control apparatus or the supervisory remote control apparatus and each power conditioner.

17. The photovoltaic power generation system according to one of claims 2, 3, 4, 5, 9, 10, 11, and 12, wherein the display apparatus displays with time detection values of the power generating condition detector, the direct-current voltage detector, the direct current detector, the alternating-current power detector, and a direct-current power arithmetic unit which calculates direct-current power from values detected by the direct-current voltage detector and the direct current detector.

18. The photovoltaic power generation system according to one of claims 2, 3, 4, 5, 9, 10, 11, and 12,
wherein the display apparatus displays the P-V characteristics from a detection value (P) of the direct current arithmetic unit and a detection value (V) of the direct-current voltage detector, a maximum power point, and a detection value of the power generating condition detector simultaneously with characteristics of the photovoltaic array or photovoltaic arrays.

19. The photovoltaic power generation system according to one of claims 2, 3, 4, 5, 9, 10, 11, and 12,
wherein the display apparatus simultaneously displays the I-V characteristics from a detection value (I) of the direct current detector and a detection value (V) of the direct-current voltage detector and a detection value of the power generating condition detector.

20. The photovoltaic power generation system according to one of claims 2, 3, 4, 5, 9, 10, 11, and 12,
wherein the display apparatus displays a detection value (I) of the direct current detector simultaneously with characteristics of the photovoltaic array or each of the photovoltaic arrays.

21. The photovoltaic power generation system according to claim 17,
wherein the display apparatus displays with time detection values of the alternating-current power detector and a direct-current power arithmetic unit which calculates direct-current power from values detected from the direct-current voltage detector and the direct current detector.

22. The photovoltaic power generation system according to claim 13,
wherein the display apparatus simultaneously displays P-V characteristics in a full direct-current voltage region obtained by a switch provided on a direct-current output side and a maximum power point.

* * * * *